United States Patent
Noboa et al.

(10) Patent No.: US 10,317,261 B2
(45) Date of Patent: Jun. 11, 2019

(54) SYSTEMS AND METHODS FOR CONTROLLING FLOW RATE USING DIFFERENTIAL PRESSURE MEASUREMENTS

(71) Applicant: Johnson Controls Technology Company, Holland, MI (US)

(72) Inventors: Homero L. Noboa, Waukesha, WI (US); Kirk H. Drees, Cedarburg, WI (US)

(73) Assignee: Johnson Controls Technology Company, Auburn Hill, MI (US)

(*) Notice: Subject to any disclaimer, the term of this patent is extended or adjusted under 35 U.S.C. 154(b) by 603 days.

(21) Appl. No.: 14/788,681

(22) Filed: Jun. 30, 2015

(65) Prior Publication Data

US 2017/0003150 A1    Jan. 5, 2017

(51) Int. Cl.
| | | |
|---|---|---|
| F02D 41/30 | (2006.01) | |
| G01F 1/34 | (2006.01) | |
| F25B 13/00 | (2006.01) | |
| F24F 3/044 | (2006.01) | |
| F24F 11/30 | (2018.01) | |
| F24F 110/40 | (2018.01) | |
| F24F 11/62 | (2018.01) | |

(Continued)

(52) U.S. Cl.
CPC ........... G01F 1/34 (2013.01); F25B 13/00 (2013.01); F24F 3/044 (2013.01); F24F 11/30 (2018.01); F24F 11/62 (2018.01); F24F 11/63 (2018.01); F24F 11/74 (2018.01); F24F 2110/40 (2018.01); Y02B 30/767 (2013.01)

(58) Field of Classification Search
None
See application file for complete search history.

(56) References Cited

U.S. PATENT DOCUMENTS

| | | |
|---|---|---|
| 6,332,111 B1 | 12/2001 | Fincke |
| 6,430,985 B1 * | 8/2002 | Drees ................ G01F 1/363 |
| | | 702/100 |

(Continued)

FOREIGN PATENT DOCUMENTS

| | | |
|---|---|---|
| CN | 102213606 A | 10/2011 |
| CN | 202281632 U | 6/2012 |

OTHER PUBLICATIONS

Uncertaintuy analysis for virtual flow meter using an air-handling unit chilled water valve (HVAC&R research (2013) 19,335-345).*

(Continued)

*Primary Examiner* — Ali Naraghi
(74) *Attorney, Agent, or Firm* — Foley & Lardner LLP

(57) ABSTRACT

Systems and methods for estimating a flow rate through a device are provided. One or more pressure sensors measure a plurality of pressure differentials across a tested device. A temporary flow rate sensor measures a plurality of flow rates through the tested device. Each of the measured flow rates corresponds to one of the measured pressure differentials. A regression model trainer generates regression coefficients for a flow rate model using the measured pressure differentials and corresponding flow rates. A flow rate estimator uses the flow rate model to estimate a flow rate through a tested or untested device as a function of a measured pressure differential across the tested or untested device.

12 Claims, 12 Drawing Sheets

(51) Int. Cl.
*F24F 11/63* (2018.01)
*F24F 11/74* (2018.01)

(56) References Cited

U.S. PATENT DOCUMENTS

| | | |
|---|---|---|
| 8,423,303 B2 | 4/2013 | Soleng et al. |
| 8,789,556 B2 | 7/2014 | Yasuda et al. |
| 2008/0082304 A1* | 4/2008 | Miller .................... G05B 17/02 703/9 |
| 2013/0204587 A1* | 8/2013 | Cheng .................... G05B 17/02 703/2 |
| 2014/0088414 A1 | 3/2014 | Mittal et al. |
| 2014/0187928 A1 | 7/2014 | Mittal et al. |

OTHER PUBLICATIONS

Chinese office action on Chinese Patent Application No. 201610496388.8 dated Sep. 12, 2018. 9 pages.
Tong, et. al., "Application of Virtual Instrument Technique in Mass Flow Measurement", Journal of North China Electric Power University, vol. 29, No. 3, Jul. 31, 2002. 4 pages.

* cited by examiner

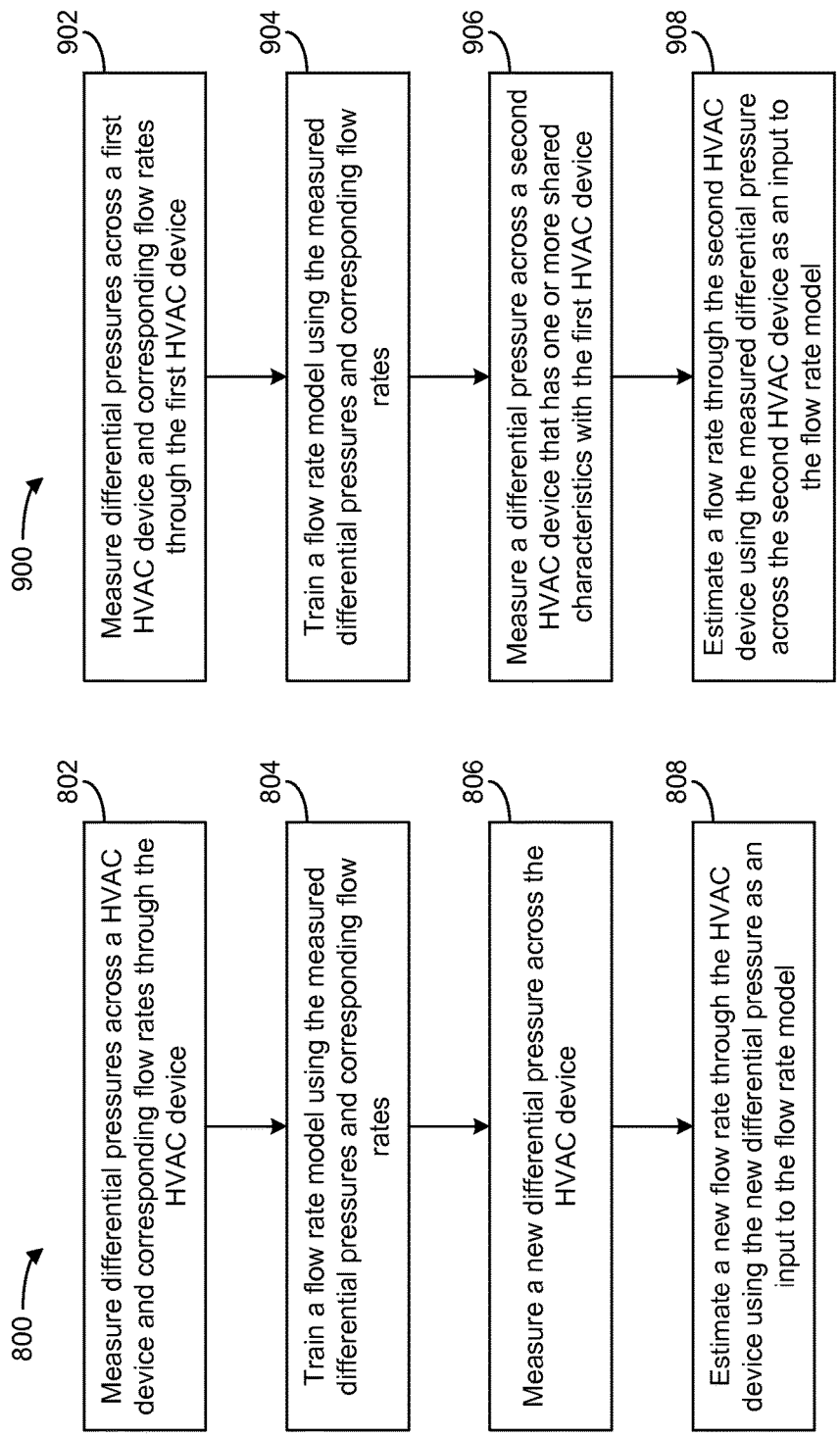

SYSTEMS AND METHODS FOR CONTROLLING FLOW RATE USING DIFFERENTIAL PRESSURE MEASUREMENTS

BACKGROUND

The present invention relates generally to heating, ventilating, air conditioning, or refrigeration (HVAC) systems. The present invention relates more particularly to systems and methods for estimating a flow rate through a HVAC device (e.g., a heat exchanger) based on a measured pressure differential across the HVAC device.

HVAC systems generally include a variety of HVAC devices configured to facilitate heating, cooling, refrigeration, and/or other HVAC applications. The flow rate of a refrigerant, coolant, or other working fluid through a HVAC device may be a useful quantity for purposes of determining a heating, cooling, or refrigeration load served by the HVAC device. The flow rate of a fluid through a HVAC device is typically measured using a flow rate sensor installed upstream or downstream of the HVAC device. However, flow rate sensors can be expensive, inaccurate, and are often difficult to properly calibrate and maintain. Flow rate measurements can also have a high uncertainty associated therewith. It would be desirable to provide a system or method for obtaining flow rate information that overcomes these and other disadvantages of conventional flow rate measurements.

SUMMARY

One implementation of the present disclosure is a system for estimating a mass or volumetric flow rate through a device. In some embodiments, the device is a HVAC device. The system includes one or more pressure sensors configured to measure a plurality of pressure differentials across a tested device and a flow rate sensor configured to measure a plurality of flow rates through the tested device. Each of the measured flow rates corresponds to one of the measured pressure differentials. The system further includes a regression model trainer configured to generate regression coefficients for a flow rate model using the measured pressure differentials and corresponding flow rates. The flow rate model estimates a flow rate as a function of a pressure differential. The system further includes a flow rate estimator configured to use the flow rate model to estimate a flow rate through a tested or untested device as a function of a new measured pressure differential across the tested or untested device.

In some embodiments, the tested device is a first heat exchanger and the untested device is a second heat exchanger that has one or more device characteristics in common with the first heat exchanger. The one or more device characteristics may include at least one of a device model code, a material tube index, a number of heat exchange passes, and a water box type.

In some embodiments, the flow rate estimator is a component of the tested device and the estimated flow rate is a flow rate through the tested device. In other embodiments, the flow rate estimator is a component of the untested device and the estimated flow rate is a flow rate through the untested device. In other embodiments, the flow rate estimator is a component of a controller for the tested or untested device.

In some embodiments, the system further includes a device clusterer configured to organize a plurality of devices into clusters based on one or more device characteristics associated with the devices. The device clusterer may be configured to select the untested device from a plurality of devices organized into a same cluster as the tested device.

In some embodiments, the device clusterer is configured to generate a clustered set of test data including (1) the measured pressure differentials and corresponding flow rates for the tested device and (2) measured pressure differentials and corresponding flow rates for one or more other devices organized into a same cluster as the tested device. The regression model trainer may use the clustered set of test data to generate the regression coefficients for the flow rate model.

In some embodiments, the system further includes an uncertainty calculator. The uncertainty calculator may be configured to determine an uncertainty of one or more of the regression coefficients in the flow rate model and generate a set of uncertainty model parameters based on the determined uncertainties. The uncertainty calculator may use the uncertainty model parameters, an idiosyncratic uncertainty, and a sensor uncertainty in an uncertainty model to determine an uncertainty of the estimated flow rate.

Another implementation of the present disclosure is a method for estimating a mass or volumetric flow rate through a tested device. In some embodiments, the device is a HVAC device. The method includes measuring pressure differentials across a tested device and corresponding flow rates through the tested device at a plurality of different pressure differentials and flow rates. The method further includes training a flow rate model using the measured pressure differentials and corresponding flow rates. The flow rate model estimates a flow rate as a function of a pressure differential. The method further includes measuring a new pressure differential across the tested device and estimating a new flow rate through the tested device using the new pressure differential as an input to the flow rate model.

In some embodiments, the method includes organizing a plurality of devices into clusters based on one or more device characteristics associated with the plurality of devices. The plurality of devices may include the tested device and one or more other devices. In some embodiments, the one or more device characteristics include at least one of a device model code, a material tube index, a number of heat exchange passes, and a water box type.

In some embodiments, the method includes generating a clustered set of test data including (1) the measured pressure differentials and corresponding flow rates for the tested device and (2) measured pressure differentials and corresponding flow rates for one or more of the other devices organized into a same cluster as the tested device. Training the flow rate model may include using the clustered set of test data to generate regression coefficients for the flow rate model.

In some embodiments, the method includes determining an uncertainty of one or more trained parameters in the flow rate model, generating a set of uncertainty model parameters based on the determined uncertainties, and using the uncertainty model parameters, an idiosyncratic uncertainty, and a sensor uncertainty in an uncertainty model to determine an uncertainty of the estimated flow rate.

Another implementation of the present disclosure is a method for estimating a mass or volumetric flow rate through a device. In some embodiments, the device is a HVAC device. The method includes measuring pressure differentials across a first device and corresponding flow rates through the first device at a plurality of different pressure differentials and flow rates. The method further includes training a flow rate model using the measured pressure differentials and corresponding flow rates. The flow rate model estimates a flow rate as a function of a pressure differential. The method further includes measuring a pressure differential across a second device that has one or more device characteristics in common with the first device. The method further includes estimating a flow rate through the second device using the measured pressure differential across the second device as an input to the flow rate model.

In some embodiments, the first device is a first heat exchanger and the second device is a second heat exchanger that has one or more device characteristics in common with the first heat exchanger. The one or more device characteristics may include at least one of a device model code, a material tube index, a number of heat exchange passes, and a water box type.

In some embodiments, the method includes organizing a plurality of devices into clusters based on one or more device characteristics associated with the plurality of devices. The plurality of devices may include the first device and one or more other devices.

In some embodiments, the method includes generating a clustered set of test data including (1) the measured pressure differentials and corresponding flow rates for the first device and (2) measured pressure differentials and corresponding flow rates for one or more of the other devices organized into a same cluster as the first device. Training the flow rate model may include using the clustered set of test data to generate regression coefficients for the flow rate model.

In some embodiments, the method includes determining an uncertainty of one or more trained parameters in the flow rate model, generating a set of uncertainty model parameters based on the determined uncertainties, and using the uncertainty model parameters, an idiosyncratic uncertainty, and a sensor uncertainty in an uncertainty model to determine an uncertainty of the estimated flow rate.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 8 is a flowchart of a process for estimating a flow rate through a tested HVAC device, according to an exemplary embodiment.

FIG. 9 is a flowchart of a process for estimating a flow rate through an untested HVAC device, according to an exemplary embodiment.

DETAILED DESCRIPTION

Figure 1:
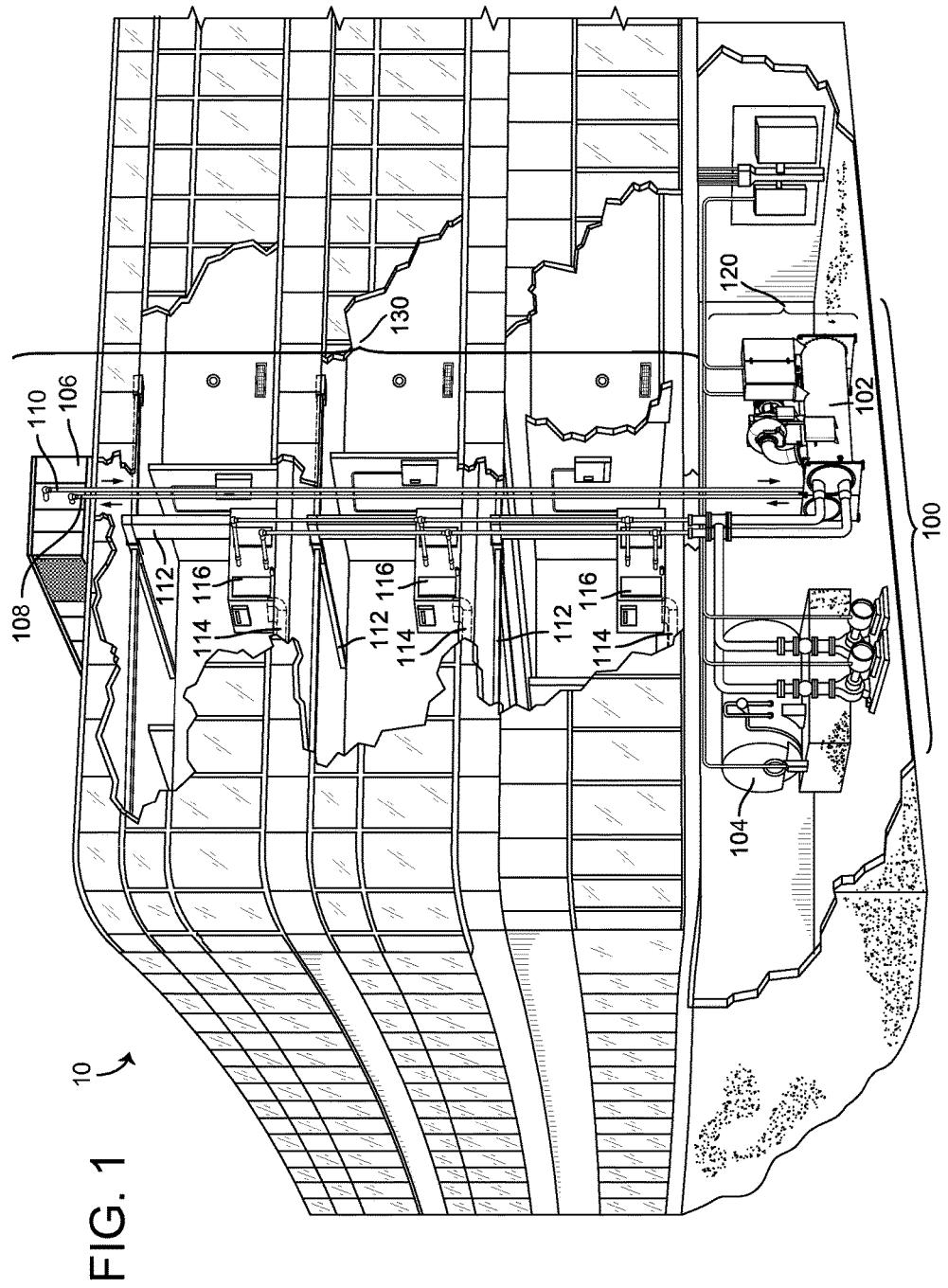
FIG. 1 is a perspective view of a building served by a building management system (BMS), according to an exemplary embodiment.

Referring generally to the FIGURES, systems and methods for estimating flow rates in a heating, ventilation, or air conditioning (HVAC) system using differential pressure measurements are shown, according to various exemplary embodiments. A HVAC device testing system is used to test the fluid flow characteristics of various HVAC devices (e.g., evaporators, condensers, chillers, etc.) in order to determine a relationship between two or more variables that characterize the fluid flow through the HVAC devices. In some embodiments, the variables tested by the HVAC device testing system include flow rate $\dot{F}$ and differential pressure $\Delta P$. The tested flow rate $\dot{F}$ may be a mass flow rate $\dot{F}_m$ or a volumetric flow rate $\dot{F}_V$ of a fluid flow (i.e., a liquid or gas flow) through a tested HVAC device. The differential pressure $\Delta P$ may be a pressure drop across the tested HVAC device or a component thereof (i.e., a pressure differential). The HVAC device testing system collects (e.g., measures) multiple data points for the tested variables while the tested HVAC device is operated over a range of fluid flow conditions. For example, the HVAC device testing system may measure the differential pressure $\Delta P$ and the corresponding flow rate $\dot{F}$ at a plurality of different pressures and/or flow rates.

The HVAC device testing system may use the collected data points to train a regression model that predicts one of the tested variables as a function of one or more of the other tested variables. For example, the HVAC device testing system may use the measured differential pressures $\Delta P$ and the corresponding flow rates $\dot{F}$ to train a regression model that estimates flow rate $\hat{F}$ as a function of differential pressure $\Delta P$, as shown in the following equation:

$$\hat{F} = a \Delta P^b$$

where the parameters a and b are regression coefficients trained by the HVAC device testing system based on the measured test data.

In some embodiments, the HVAC device testing system performs the testing procedure for multiple different HVAC devices. The HVAC device testing system may organize the tested HVAC devices into a plurality of groups or clusters based on one or more characteristics of the devices. For example, the HVAC device testing system may organize a set of tested heat exchangers into clusters based on device characteristics such as the device type, device manufacturer, model code, material tube index (MTI), number of passes, water box type, and/or any device characteristic that affects (or correlates with) the performance of the HVAC device with respect to any of the tested variables. In some embodiments, the HVAC device testing system combines the test data for multiple HVAC devices within the same cluster and uses the combined test data to train a regression model for the cluster.

The regression models and/or the regression coefficients trained by the HVAC device testing system may be stored within various HVAC devices. In some embodiments, a regression model is stored within the memory of the tested HVAC device. In some embodiments, a regression model is stored within other HVAC devices that have similar characteristics (e.g., model code, MTI, number of passes, water box type, etc.) to the tested HVAC device. In some embodiments, the regression models are stored in controllers for the HVAC devices rather than the HVAC devices themselves.

Once the testing procedure is complete, the flow rate sensor is no longer needed and may be removed from the tested HVAC device. In operation, the differential pressure $\Delta P$ across a tested or untested HVAC device may be measured using one or more pressure sensors. The HVAC device (or controller for the HVAC device) may use the stored regression model to automatically calculate the estimated flow rate $\hat{F}$ as a function of the measured differential pressure $\Delta P$. Advantageously, this feature allows the HVAC device (or controller for the HVAC device) to determine and/or report values for multiple correlated variables without requiring independent sensors to measure both variables. Additional advantages and features of the present invention are described in greater detail below.

HVAC and Building Management System

Referring now to FIGS. 1-4, an exemplary building management system (BMS) and HVAC system in which the systems and methods of the present invention may be implemented are shown, according to an exemplary embodiment. Although the present invention is described primarily with reference to HVAC devices in a building HVAC system, it should be understood that the systems and methods described herein can be used to determine flow rates through any type of system or device (e.g., industrial devices, food processing devices, irrigation devices, medical devices, sprinkler systems, building equipment, etc.) and are not limited to HVAC devices.

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
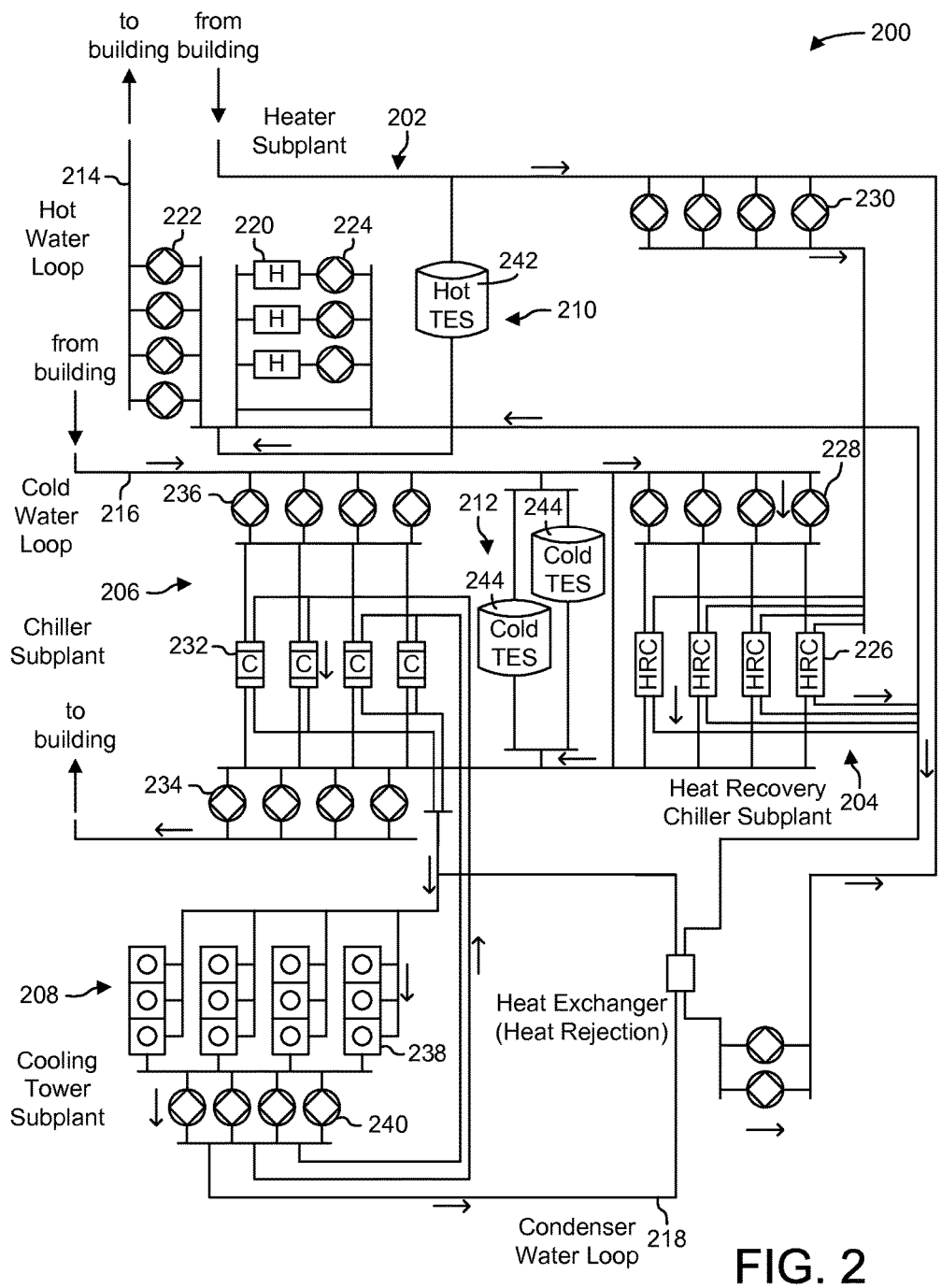
FIG. 2 is a block diagram of a waterside system which may be used in conjunction with the BMS of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
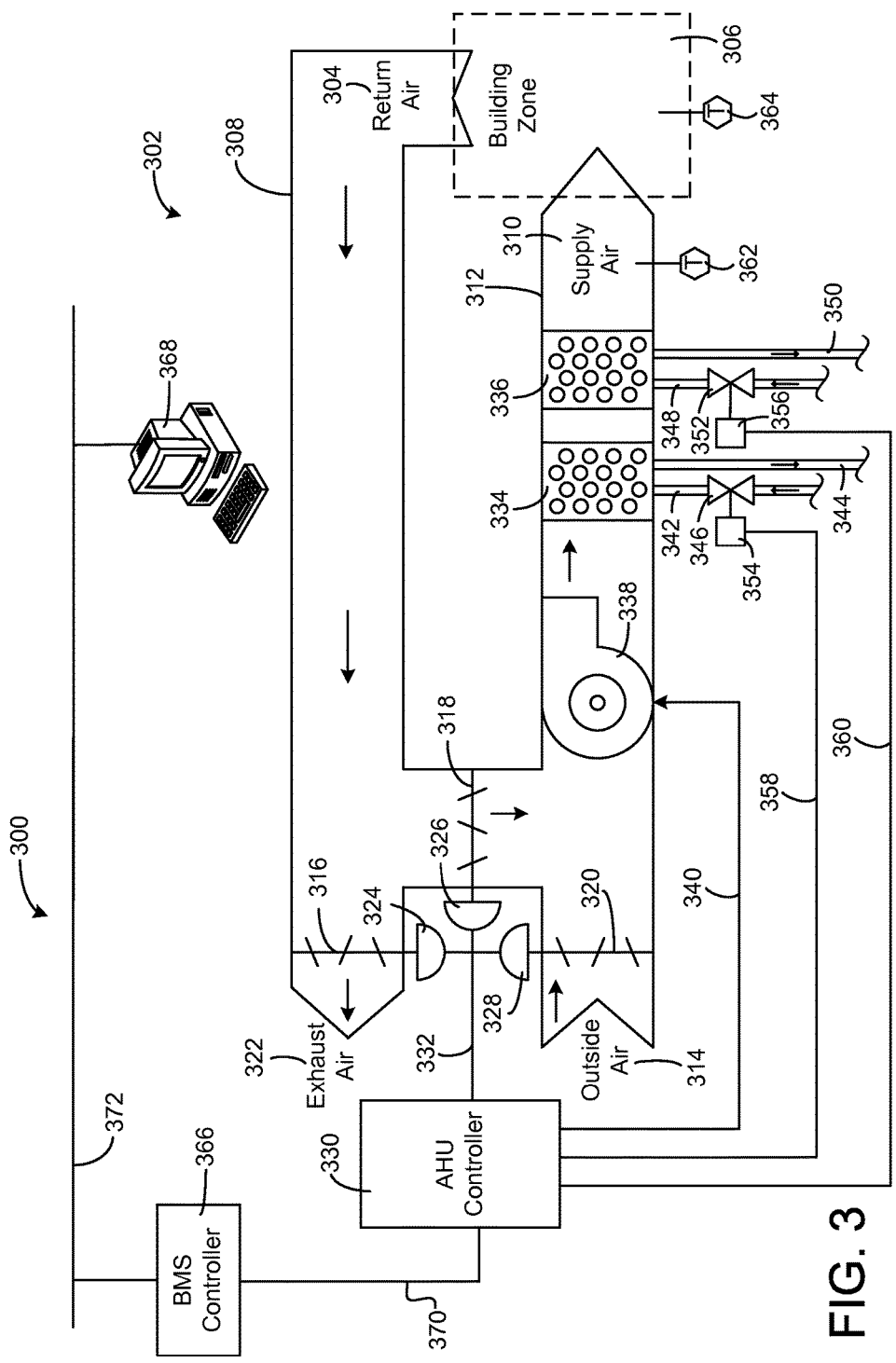
FIG. 3 is a block diagram of an airside system which may be used in conjunction with the BMS of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
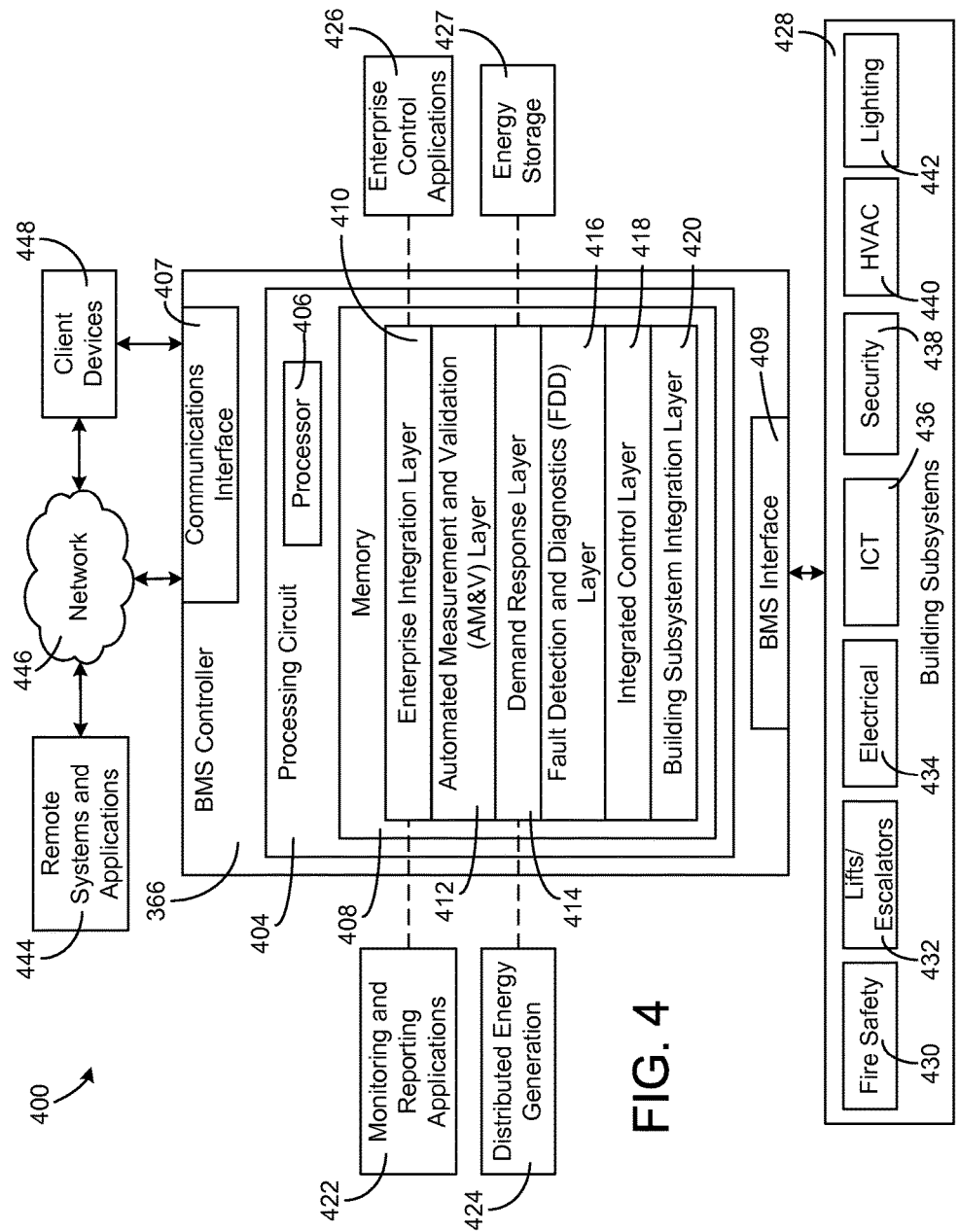
FIG. 4 is a block diagram of the BMS of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

HVAC Device Testing

Figure 5A:
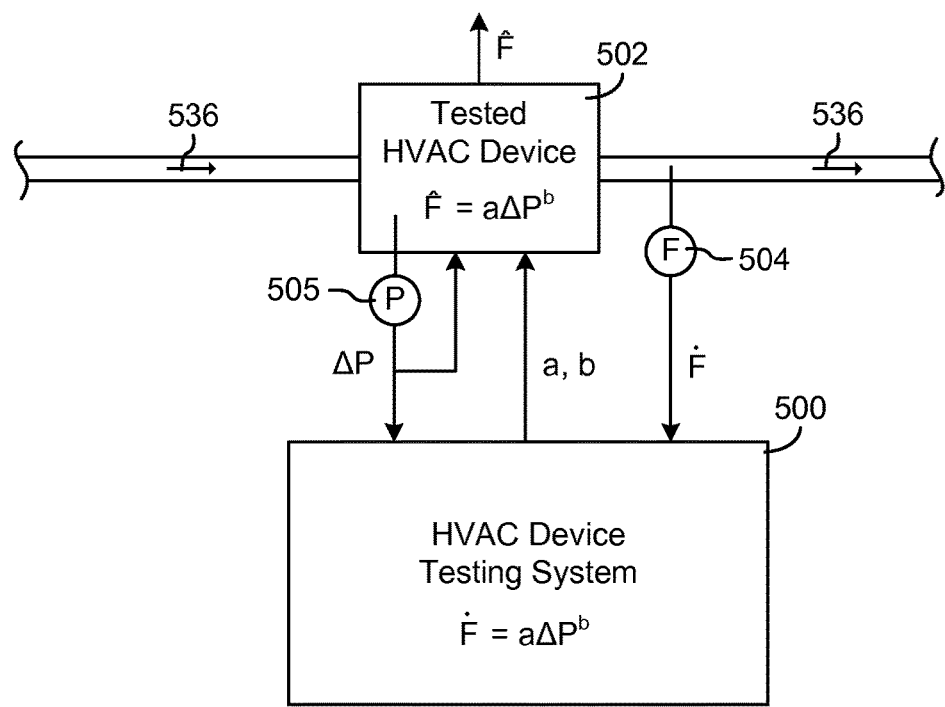
FIG. 5A is block diagram of a HVAC device testing system configured to perform a field testing procedure to train a flow rate model that estimates a flow rate through a HVAC device as a function of a pressure differential across the HVAC device, according to an exemplary embodiment.
Figure 5B:
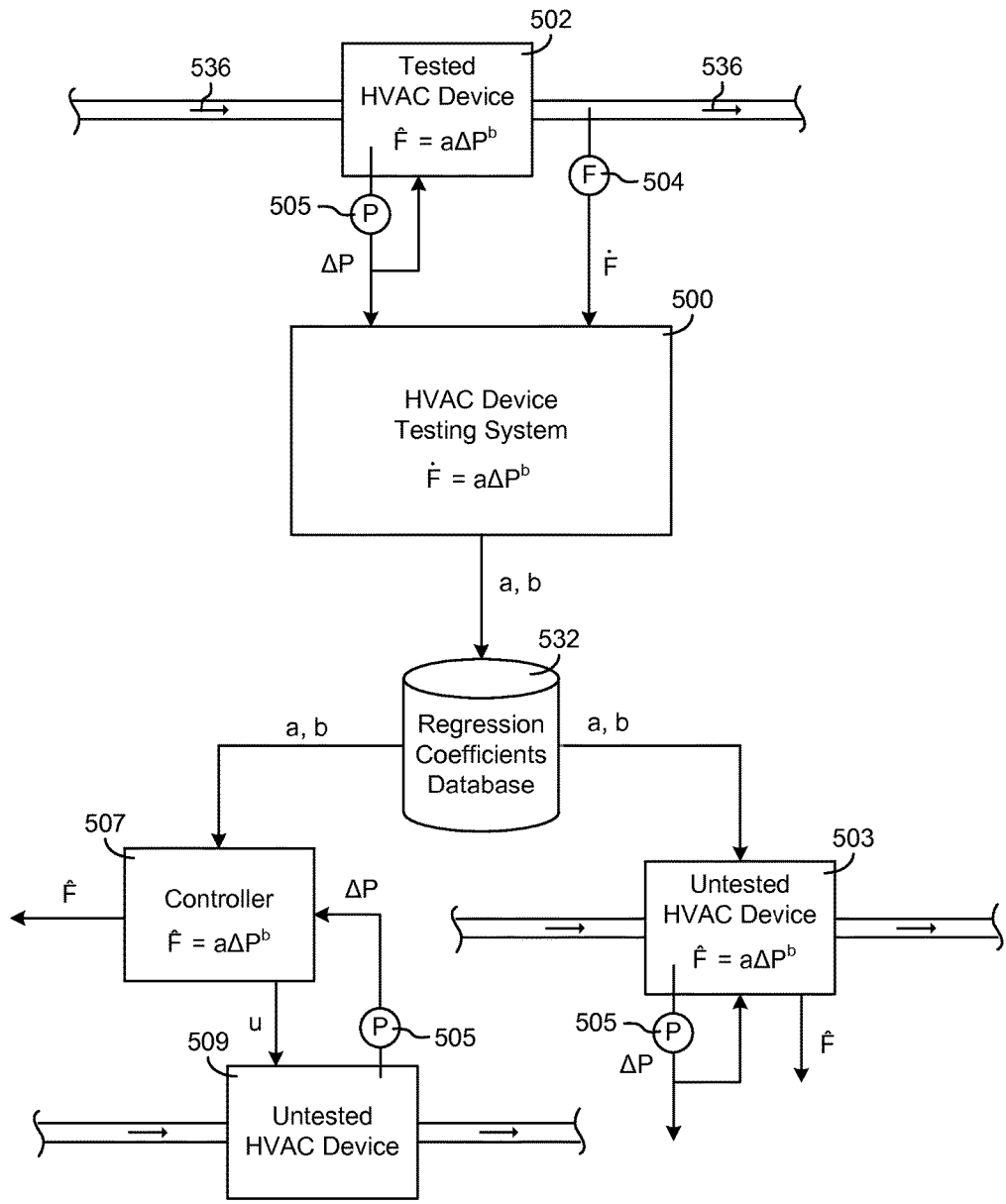
FIG. 5B is block diagram of a HVAC device testing system configured to perform a factory testing procedure to train a flow rate model that estimates a flow rate through a HVAC device as a function of a pressure differential across similar HVAC devices, according to an exemplary embodiment.

Referring now to FIGS. 5A-5B, a HVAC device testing system 500 is shown, according to an exemplary embodiment. In various embodiments, HVAC device testing system 500 may be implemented as a component of BMS 400, airside system 300, waterside system 200, HVAC system 100, or as a separate system that interacts with any of systems 100-400. HVAC device testing system 500 may be configured to test the fluid flow characteristics of various HVAC devices (e.g., evaporators, condensers, chillers, etc.) in order to determine a relationship between two or more variables that characterize the fluid flow through the HVAC devices. FIG. 5A illustrates a "field testing" implementation in which HVAC device testing system 500 is used to test a particular HVAC device that is currently in use at a customer site. FIG. 5B illustrates a "factory testing" implementation in which HVAC device testing system 500 is used to test various HVAC devices at the factory or other off-site location. Both of these implementations are described in greater detail below.

In some embodiments, the variables tested by HVAC device testing system 500 include flow rate $\dot{F}$ and differential pressure $\Delta P$. The tested flow rate $\dot{F}$ may be a mass flow rate $\dot{F}_m$ or a volumetric flow rate $\dot{F}_V$ of a fluid flow 536 through a tested HVAC device 502. In some embodiments, tested flow rate $\dot{F}$ is measured by a flow rate sensor 504 installed downstream or upstream of the tested HVAC device 502. In other embodiments, flow rate sensor 504 may be integrated with the tested HVAC device 502 and the tested flow rate $\dot{F}$ may be provided as a data output from the tested HVAC device 502.

Figure 6:
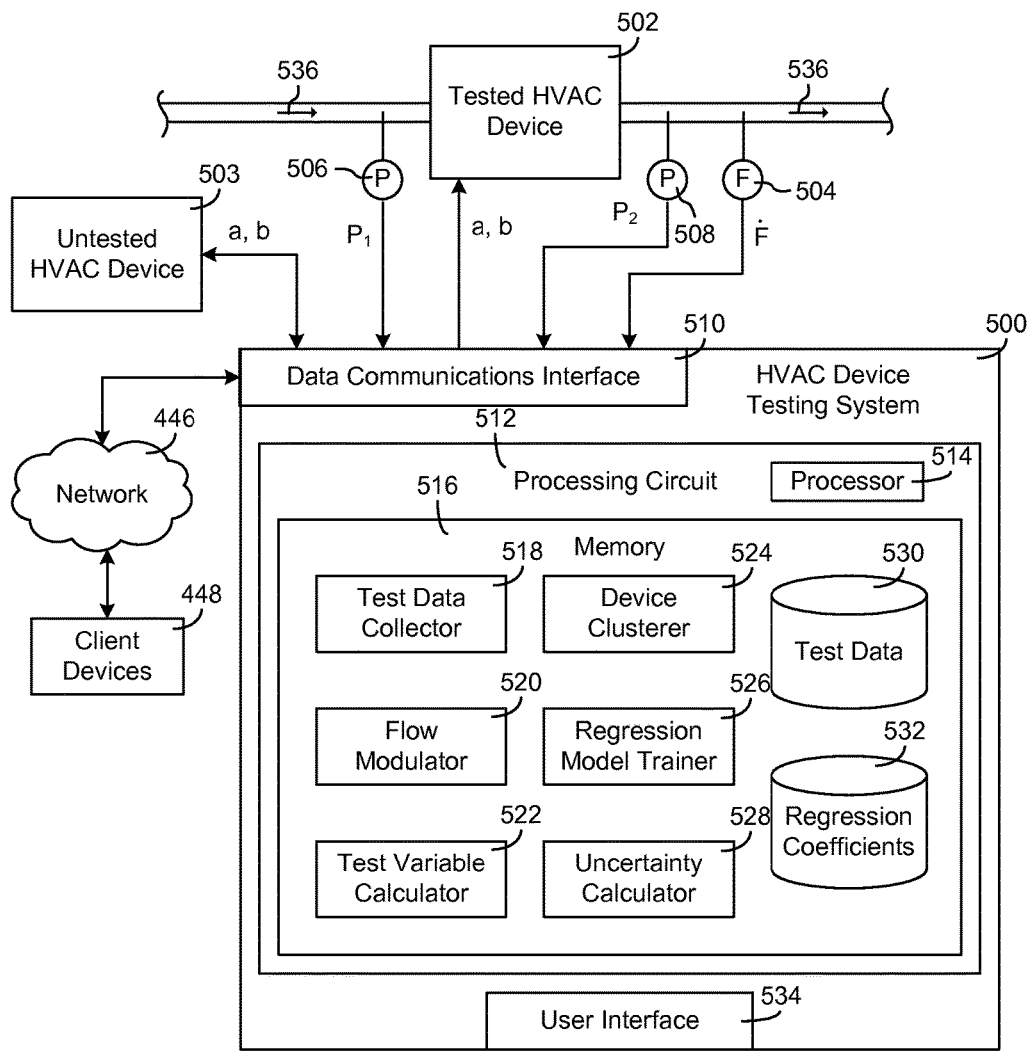
FIG. 6 is a block diagram illustrating the HVAC device testing system of FIG. 5 in greater detail, according to an exemplary embodiment.

The differential pressure $\Delta P$ may be a pressure drop across the tested HVAC device 502 or a component thereof. In some embodiments, the differential pressure $\Delta P$ is measured using an integrated (e.g., factory-installed) differential pressure sensor 505 within the tested HVAC device 502 and provided as a data output from the tested HVAC device 502. In other embodiments, the differential pressure $\Delta P$ is calculated by subtracting a pressure $P_2$ downstream of the tested HVAC device from a pressure $P_1$ upstream of the tested HVAC device (i.e., $\Delta P = P_1 - P_2$). The upstream pressure $P_1$ and the downstream pressure $P_2$ may be measured using an upstream pressure sensor 506 and a downstream pressure sensor 508, as shown in FIG. 6.

Referring particularly to FIG. 5A, a field testing implementation of HVAC device testing system 500 is shown, according to an exemplary embodiment. In the field testing implementation, HVAC device testing system 500 receives measurements of the tested variables for a particular HVAC device 502 that is currently in use at a customer site. HVAC device testing system 500 may be configured to collect (e.g., measure) multiple data points for the tested variables while the tested HVAC device 502 is operated over a range of fluid flow conditions. For example, HVAC device testing system 500 may measure the differential pressure $\Delta P$ and the corresponding flow rate $\dot{F}$ at a plurality of different pressures and/or flow rates.

HVAC device testing system 500 may use the collected data points to train a regression model that predicts one of the tested variables as a function of one or more of the other tested variables. For example, HVAC device testing system 500 may use the measured differential pressures $\Delta P$ and the corresponding flow rates $\dot{F}$ to train a regression model that estimates flow rate $\hat{F}$ as a function of differential pressure $\Delta P$, as shown in the following equation:

$$\hat{F} = a\Delta P^b$$

where the parameters a and b are regression coefficients trained by HVAC device testing system 500 based on the test data. It should be understood that the regression model $\hat{F} = a\Delta P^b$ is merely exemplary and that other forms or types of regression models can be used by HVAC device testing system 500 in various embodiments.

In the field testing implementation, HVAC device testing system 500 may provide the regression model and/or the regression coefficients to the tested HVAC device 502. In some embodiments, the regression model is stored within the memory of the tested HVAC device 502. For example, HVAC device testing system 500 is shown providing the regression coefficients a and b to the tested HVAC device 502.

Once the testing procedure is complete, flow rate sensor 504 is no longer needed and may be removed from the tested HVAC device 502. In operation, the differential pressure $\Delta P$ across the tested HVAC device 502 may be measured using an integrated pressure sensor 505 (as shown in FIG. 5A) or upstream and downstream pressure sensors 506 and 508 (as shown in FIG. 6). The tested HVAC device 502 may use the stored regression model to automatically calculate the estimated flow rate $\hat{F}$. Advantageously, this feature allows the tested HVAC device 502 to determine and/or report values for multiple correlated variables without requiring independent sensors to measure both variables.

Referring now to FIG. 5B, a factory testing implementation of HVAC device testing system 500 is shown, according to an exemplary embodiment. In the factory testing implementation, HVAC device testing system 500 performs the testing procedure for multiple different tested HVAC devices 502. HVAC device testing system 500 may organize the tested HVAC devices 502 into a plurality of groups or clusters based on one or more characteristics of the tested HVAC devices 502. For example, HVAC device testing system 500 may organize a set of tested heat exchangers into clusters based on device characteristics such as the device type, device manufacturer, model code, material tube index (MTI), number of heat exchange passes, water box type, and/or any device characteristic that affects (or correlates with) the performance of the HVAC device with respect to any of the tested variables. In some embodiments, HVAC device testing system 500 combines the test data for multiple HVAC devices within the same cluster and uses the combined test data to train a regression model for the cluster.

The regression models and/or the regression coefficients trained by HVAC device testing system 500 may be stored in a regression coefficients database 532. Regression coefficients database 532 may store each set of regression coefficients a and b with one or more parameters that characterize the HVAC device or devices to which the set of regression coefficients apply (e.g., device type, device manufacturer, model code, MTI, etc.). The regression coefficients a and b can be retrieved from regression coefficients database 532 and stored within various untested HVAC devices 503 or controllers 507 for untested HVAC devices that have the same or similar characteristics as the tested HVAC devices 502 used to generate the regression coefficients.

In some embodiments, a regression model is stored within other HVAC devices that have similar characteristics (e.g., model code, MTI, number of passes, water box type, etc.) to the tested HVAC devices 502. For example, regression coefficients database 532 is shown providing the regression coefficients a and b to an untested HVAC device 503. In some embodiments, the regression models are stored in controllers for the HVAC devices rather than the HVAC devices themselves. For example, regression coefficients database 532 is shown providing the regression coefficients a and b to a controller 507 for an untested HVAC device 509. The regression coefficients a and b can be stored within devices 503 and 507 prior to distribution to a customer (e.g., in the factory) or uploaded to devices 503 and 507 at a later time (e.g., via a communications network, via removable storage media, etc.).

In operation, the differential pressure ΔP across an untested HVAC device 503 or 509 may be measured using an integrated differential pressure sensor 505 (as shown in FIG. 5B) or upstream and downstream pressure sensors 506 and 508 (as shown in FIG. 6). In various embodiments, the differential pressure measurements ΔP are provided to a controller 507 for an untested HVAC device 509 or used internally by the untested HVAC device 503. The untested HVAC device 503 or controller 507 for the untested HVAC device 509 may use the stored regression model to automatically calculate the estimated flow rate $\hat{F}$. Advantageously, this feature allows the untested HVAC device 503 or controller 507 for the untested HVAC device 509 to determine and/or report values for multiple correlated variables without requiring independent sensors to measure both variables. Additional advantages and features of HVAC device testing system 500 are described in greater detail with reference to FIG. 6.

Referring now to FIG. 6, a block diagram illustrating HVAC device testing system 500 in greater detail is shown, according to an exemplary embodiment. HVAC device testing system 500 is shown to include a data communications interface 510 and a processing circuit 512. Data communications interface 510 may include wired or wireless communications interfaces (e.g., jacks, antennas, transmitters, receivers, transceivers, wire terminals, etc.) for conducting electronic data communications with tested HVAC devices (e.g., tested HVAC 502), untested HVAC devices (e.g., untested HVAC devices 503, 509), sensors (e.g., sensors 504-508), controllers (e.g., controller 507, BMS controller 366), and/or other external systems or devices. Communications via interface 510 may be direct (e.g., local wired or wireless communications) or via a communications network 446 (e.g., a WAN, the Internet, a cellular network, etc.). For example, data communications interface 510 may include an Ethernet card and port for sending and receiving data via an Ethernet-based communications link or network. In another example, data communications interface 510 may include a WiFi transceiver for communicating via a wireless communications network. In some embodiments, data communications interface 510 is configured to communicate using the BACnet communications protocol.

Data communications interface 510 may receive measurements from one or more sensors (e.g., sensors 504-508) configured to measure the variables that characterize the fluid flow 536 through a tested HVAC device 502. For example, data communications interface 510 may receive measured pressures and/or flow rates from sensors 504-508 and provide the measurements to processing circuit 512. Processing circuit 512 may be communicably connected to data communications interface 510 such that processing circuit 512 and the various components thereof can send and receive data via communications interface 510.

Processing circuit 512 is shown to include a processor 514 and memory 516. Processor 514 can be implemented as a general purpose processor, an application specific integrated circuit (ASIC), one or more field programmable gate arrays (FPGAs), a group of processing components, or other suitable electronic processing components. Memory 516 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 516 may be or include volatile memory or non-volatile memory. Memory 516 may include database components, object code components, script components, or any other type of information structure for supporting the various activities and information structures described in the present application. According to an exemplary embodiment, memory 516 is communicably connected to processor 514 via processing circuit 512 and includes computer code for executing (e.g., by processing circuit 512 and/or processor 514) one or more processes described herein.

In some embodiments, HVAC device testing system 500 and processing circuit 512 are implemented within a single computer (e.g., one server, one housing, etc.). In other embodiments various components of HVAC device testing system 500 may be distributed across multiple servers or computers that can exist in distributed locations. For example, data communications interface 510 may receive measurements from sensors 504-508 and send the measurements to a remote processing circuit 512 for further processing. In some embodiments, one or more components of processing circuit 512 are implemented using a cloud-based computing platform such as the PANOPTIX® brand building efficiency platform sold by Johnson Controls, Inc.

Still referring to FIG. 6, memory 516 is shown to include a test data collector 518. Test data collector 518 may be configured to collect test data describing the flow characteristics of various tested HVAC devices 502. Collected test data may include, for example, measured pressures, measured flow rates, measured temperatures, measured humidities, or any other type of measured data value that describes a fluid flow 536 through a tested HVAC device 502.

Although only one tested HVAC device 502 is shown in FIG. 6, it should be understood that test data collector 518 may receive and store test data for any number and/or type of HVAC devices. In various embodiments, the tested HVAC devices 502 may be passive HVAC components or active HVAC components. Passive HVAC components may include, for example, heat exchangers (e.g., condensers, evaporators, cooling coils, heating coils, gas coolers, etc.), flow control elements (e.g., pipes, ducts, tubes, flow restrictors, etc.), and the like. Active HVAC components may include, for example, chillers, heaters, electronic valves, compressors, fans, or any other HVAC component that typically requires energy to operate.

Measured test data may be received from one or more sensors (e.g., sensors 504-508) via data communications interface 510. In some embodiments, test data collector 518 receives measured test data from one or more factory-installed sensors in the tested HVAC device 502. For example, tested HVAC device 502 may include a factory-installed differential pressure sensor configured to measure a pressure differential ΔP across HVAC device 502 or a portion thereof (as shown in FIG. 5). In other embodiments, test data collector 518 receives measured test data from one or more sensors installed upstream or downstream of a tested HVAC device 502. For example, test data collector 518 may receive an upstream pressure $P_1$ from an upstream pressure sensor 506 and a downstream pressure $P_2$ from a downstream pressure sensor 508 (as shown in FIG. 6). In some embodiments, test data collector 518 receives measured test data from a flow sensor 504 installed upstream or downstream of tested HVAC device 502.

In some embodiments, test data collector 518 receives measured values for two or more correlated variables such as flow rate $\dot{F}$ and differential pressure ΔP. In other embodiments, test data collector 518 receives measured values for a single measured variable and associates the measured values with known or controlled values for the other correlated variable. For example, memory 516 is shown to include a flow modulator 520. Flow modulator 520 may be configured to modulate (e.g., adjust, control, etc.) the flow rate $\dot{F}$ through the tested HVAC device 502 such that measuring the flow rate $\dot{F}$ is not required. In some embodiments, flow modulator 520 modulates the flow rate $\dot{F}$ by providing a control signal to a fan or pump configured to affect the flow rate $\dot{F}$ through HVAC device 502. Flow modulator 520 may provide the known or controlled values for the flow rate $\dot{F}$ to test data collector 518.

Test data collector 518 may also collect data indicating device characteristics of the tested HVAC devices 502. Device characteristics may include, for example, a device type (e.g., chiller, heat exchanger, pipe, etc.), a device manufacturer, a model code, a condenser or evaporator code, a material tube index, a number of passes, a water box type, and the like. Device characteristics may be provided by a user (e.g., via user interface 534 or network 446) and/or received via data communications interface 510 in conjunction with the measured test data. The measured test data and the device characteristics may be stored by test data collector 518 in a test database 530. Each data point in test database 530 may include a measured pressure value and a corresponding measured flow rate value. In some embodiments, the measured test data may be stored along with an indication of one or more device characteristics describing the tested HVAC device 502 associated with the measured test data.

Still referring to FIG. 6, memory 516 is shown to include a test variable calculator 522. Test variable calculator 522 may be configured to determine values for one or more calculated test variables based on the measured values collected by test data collector 518. For example, the measured values collected by test data collector 518 may include an upstream pressure $P_1$ and a downstream pressure $P_2$. Test variable calculator 522 may subtract the downstream pressure $P_2$ from the upstream pressure $P_1$ to calculate the pressure differential ΔP (i.e., $\Delta P=P_1-P_2$) across the tested HVAC device 502. The calculated pressure differential ΔP may then be used as an input to the regression model to generate the regression coefficients.

In some embodiments, the test variables include calculated values such as enthalpy, entropy, fluid density, and/or other values that cannot be directly measured. Test variable calculator 522 may use thermodynamic relationships to determine values for one or more non-measured test variables. For example, test variable calculator 522 may calculate a fluid enthalpy as a function of a measured temperature and/or pressure. As another example, test variable calculator 522 may calculate a mass flow rate $\dot{F}_m$ by multiplying a known fluid density ρ by a measured volumetric flow rate $\dot{F}_v$ (i.e., $\dot{F}_m=\rho\dot{F}_v$). The mass flow rate $\dot{F}_m$ may then be used as an input to the regression model to generate the regression coefficients. In other embodiments, the volumetric flow rate $\dot{F}_v$ is used as an input to the regression model to generate the regression coefficients without first converting to a mass flow rate. The calculated test variables may be stored alongside the measured test data in test database 530.

Still referring to FIG. 6, memory 516 is shown to include a device clusterer 524. Device clusterer 524 may be configured to organize the tested HVAC devices into a plurality of groups or clusters based on one or more characteristics of the tested HVAC devices. For example, device clusterer 524 may organize a set of tested heat exchangers into clusters based on heat exchanger characteristics such as the device type (e.g., condenser, evaporator, etc.), device manufacturer, model code, material tube index (MTI), number of passes, evaporator or condenser code, water box type, and/or any device characteristic that affects (or correlates with) the performance of the HVAC device with respect to any of the tested variables.

The device characteristics used by device clusterer 524 to organize HVAC devices into clusters are referred to herein as "clustering parameters." In some embodiments, device clusterer 524 organizes the tested HVAC devices into a plurality of clusters such that all of the devices in each cluster have the same combination of clustering parameters. For example, all of the HVAC devices assigned to one cluster may have the same text string in their model name (e.g., "ABC~" where "~" is a wildcard), the same MTI number, and/or the same number of passes. In some embodiments, the clustering parameters are provided by a user (e.g., via user interface 534 or network 446) and/or received in conjunction with the measured test data. For example, device clusterer 524 may cause user interface 534 or client device 448 to display a prompt for a user to specify one or more clustering parameters used to organize the HVAC devices into clusters.

In other embodiments, device clusterer 524 automatically selects or generates one or more clustering parameters based on predefined clustering criteria (e.g., model name, MTI number, number of passes). For example, device clusterer 524 may automatically determine that HVAC devices with a model name that includes the text string "ABC" should be assigned to one cluster, whereas HVAC devices with a model name that includes the text string "DEF" should be assigned to another cluster. In some embodiments, device clusterer 524 automatically selects clustering parameters that are estimated to result in a best fit of the regression model to the clustered test data.

In some embodiments, device clusterer 524 combines the test data for multiple HVAC devices within the same cluster. For example, device clusterer 524 may organize the test data in test database 530 into a plurality of clustered sets. Each clustered set may include all of the test data (e.g., measured pressures and flow rates) corresponding to the HVAC devices within a particular cluster. Each clustered set of test data may be used by regression model trainer 526 to train a different set of regression coefficients.

Still referring to FIG. 6, memory 516 is shown to include a regression model trainer 526. Regression model trainer 526 may be configured to train regression models based on the measured and/or calculated test data in test database 530. Training a regression model may include using the test data to generate a set of coefficients for a regression model. In some embodiments, regression model trainer 526 trains a regression model using the test data from a single HVAC device. In other embodiments, regression model trainer 526 trains a regression model using a clustered set of test data for a set of related HVAC devices (e.g., HVAC devices that have shared device characteristics).

Regression model trainer 526 may be configured to perform a regression analysis in which the test data are modeled by a function which predicts a flow-related variable (e.g., an estimated flow rate $\hat{F}$) as a function of at least one other flow-related variable (e.g., differential pressure $\Delta P$) and one or more model parameters (i.e., regression coefficients). In some embodiments, regression model trainer 526 performs a nonlinear regression to generate values for the regression coefficients a and b in the following nonlinear model:

$$\hat{F} = a \Delta P^b$$

where $\hat{F}$ is a flow rate predicted by the model, $\Delta P$ is a pressure differential provided as an input to the model, and a and b are the regression coefficients or model parameters. The measured flow rates $\hat{F}$ and the measured pressures $\Delta P$ from test database 530 may be provided as inputs to regression model trainer 526 and used to generate values for the regression coefficients a and b.

Regression model trainer 526 may determine values for the regression coefficients a and b such that the resulting function best fits the test data. Regression model trainer 526 may use any of a variety of regression techniques to determine the values for a and b. For example, regression model trainer 526 may use least squares regression, ordinary least squares regression, partial least squares regression, total least squares regression, generalized least squares regression, weighted least squares regression, nonlinear least squares regression, non-negative least squares regression, iteratively reweighted least squares regression, ridge regression, Bayesian regression, or any other suitable regression technique.

The regression analysis performed by regression model trainer 526 may produce values for the regression coefficients a and b, containment limits ±L for the regression coefficients a and b, a $R^2$ value indicating the accuracy of the fit, and a random error uncertainty (RMSE). The containment limits ±L may define a range of values (e.g., maximum and minimum values) for each of the regression coefficients a and b based on a predefined containment probability (e.g., 95%, 99%, etc.). In some embodiments, the RMSE value and/or the containment limits are used by uncertainty calculator 528 to determine an uncertainty in the flow rate $\hat{F}$ estimated by the regression model. Regression model trainer 526 may store the regression coefficients a and b, the containment limits, and/or the RMSE value in regression coefficients database 532.

In some embodiments, HVAC device testing system 500 stores the trained regression model (i.e., the model equation and the regression coefficients) within the memory of the tested HVAC device(s) 502. Each of the trained regression models corresponds to a set of test data used to train the regression model and may be stored within the memory of the HVAC device(s) from which the corresponding test data was collected. The tested HVAC device(s) 502 may then use the trained regression model (e.g., during operation) to estimate a flow rate $\hat{F}$ based on a measured differential pressure $\Delta P$.

In some embodiments, HVAC device testing system 500 stores the trained regression model within the memory of one or more untested HVAC devices that are similar to the tested HVAC devices 502. For example, the trained regression model for a cluster of tested HVAC devices may be stored in one or more untested HVAC devices that satisfy the clustering parameters for the cluster (i.e., devices that would have been organized into the same cluster as the tested HVAC devices based on the clustering parameters). For example, if a cluster includes all two-pass heat exchangers with a MTI of 321 and a model name that includes the string "ABC," the regression coefficients generated for that cluster may be stored within an untested heat exchanger that also has these device characteristics (e.g., a new model of heat exchanger in the "ABC" family). The untested HVAC device may then use the trained regression model (e.g., during operation) to estimate a flow rate $\hat{F}$ based on a measured differential pressure $\Delta P$.

In some embodiments, HVAC device testing system 500 provides the trained regression model and/or the regression coefficients to another system or device. For example, the trained regression models and/or the regression coefficients may be provided to a BMS controller (e.g., BMS controller 366), a supervisory controller, and/or a local controller for the HVAC devices. The controller may then use the trained regression model to estimate a flow rate $\hat{F}$ through the HVAC devices based on a measured differential pressure $\Delta P$.

In some embodiments, the regression coefficients are provided to FDD layer 416 for use in fault detection and diagnostics. For example, FDD layer 416 may compare the regression coefficients with a previous set of regression coefficients based on a previous set of test data. A fault may be detected by FDD layer 416 if the regression coefficients have changed significantly from their previous values. The trained regression model and/or the regression coefficients may be stored locally, provided to an external system or device, and/or presented to a user via user interface 534.

Still referring to FIG. 6, memory 516 is shown to include an uncertainty calculator 528. Uncertainty calculator 528 may be configured to determine the uncertainties associated with various measured or calculated values. In some embodiments, uncertainty calculator 528 determines the uncertainty $\mu_a$ associated with the regression coefficient a, the uncertainty $\mu_b$ associated with the regression coefficient b, and the uncertainty $\mu_{\Delta P}$ associated with the differential pressure measurements $\Delta P$. Uncertainty calculator 528 may use the uncertainties $\mu_a$, $\mu_b$, and $\mu_{\Delta P}$ to calculate (or generate a formula for calculating) the uncertainty $\mu_{\hat{F}}$ associated with the flow rate $\hat{F}$ estimated by the regression model.

In some embodiments, uncertainty calculator 528 estimates the uncertainty $\mu_{\Delta P}$ associated with the differential pressure measurements $\Delta P$ using a Type A uncertainty estimation. A Type A uncertainty estimation may involve data sampling and statistical analysis. For example, uncertainty calculator 528 may obtain n independent differential pressure measurements $\Delta P$ under the same operating conditions. If the uncertainty were zero, all of the independent differential pressure measurements $\Delta P$ would ideally be the same; however, measurement uncertainty causes the measured pressures $\Delta P$ to vary. Uncertainty calculator 528 may estimate Type A uncertainty using the following equation:

$$\mu_{\Delta P} = \frac{s_{\Delta P}}{n}$$

where $s_{\Delta P}$ is the standard deviation of the differential pressure measurements $\Delta P$ and n is the number of differential pressure measurements.

In other embodiments, uncertainty calculator 528 estimates the uncertainty $\mu_{\Delta P}$ associated with the differential pressure measurements $\Delta P$ using a Type B uncertainty estimation. A Type B uncertainty estimation may be based on heuristics obtained from recollected experience and/or manufacturer-specified containment limits and containment probabilities. For example, if the measurement error is normally distributed, uncertainty calculator 528 may estimate Type B uncertainty using the following equation:

$$\mu_{\Delta P} = \frac{L}{\phi^{-1}\left(\frac{1+p}{2}\right)}$$

where L represents the containment limits (e.g., $\pm L$), p is the containment probability (e.g., 95%, 99%, etc.), and $\phi^{-1}$ is the inverse normal distribution function. The containment limits $\pm L$ and the containment probability p may be obtained from manufacturer specifications for the differential pressure sensor used to measure the differential pressure values $\Delta P$.

In some embodiments, uncertainty calculator 528 uses the Type B uncertainty estimation to estimate the uncertainties $\mu_a$ and $\mu_b$ associated with the regression model coefficients a and b. The regression analysis performed by regression model trainer 526 may generate values for the regression model coefficients a and b, as well as containment limits L and a containment probability p. For example, the regression analysis for an exemplary set of test data may produce the following information:

a=198.2 [194.4, 202] 95%
b=0.5759 [0.5691, 0.5827] 95%
SSE=3.07E3
$R^2$=0.9983
RMSE=8.6592 which indicates that the containment limits $L_a$ for a are $\pm 3.8$ (i.e., a=198.2$\pm$3.8), the containment limits $L_b$ for b are $\pm 0.0068$ (i.e., b=0.5759$\pm$0.0068), and that the containment probability p is 95% (i.e., p=0.95). From this information, uncertainty calculator 528 can estimate the uncertainties $\mu_a$ and $\mu_b$ using the following equations:

$$\mu_a = \frac{L_a}{\phi^{-1}\left(\frac{1+p}{2}\right)}$$

$$\mu_b = \frac{L_b}{\phi^{-1}\left(\frac{1+p}{2}\right)}$$

In some embodiments, uncertainty calculator 528 calculates (or generates a formula for calculating) the uncertainty $\mu_{\hat{F}}$ associated with the flow rate $\hat{F}$ estimated by the regression model. As previously described, the model for calculating flow rate $\hat{F}$ may have the form $\hat{F}=a\Delta P^b$. The uncertainty $\mu_{\hat{F}}$ may have depend on uncertainties $\mu_a$ and $\mu_b$ associated with the regression model coefficients a and b, the random error uncertainty (RMSE), and the uncertainty $\mu_{\Delta P}$ associated with the differential pressure measurements $\Delta P$. In some embodiments, a, b, and $\Delta P$ are independent and each is normally distributed.

Uncertainty calculator 528 may calculate the flow rate uncertainty $\mu_{\hat{F}}$ using an uncertainty model, as shown in the following equations:

$$\mu_F = \sqrt{\left(\frac{\partial F}{\partial a}\right)^2 \mu_a^2 + \left(\frac{\partial F}{\partial b}\right)^2 \mu_b^2 + RMSE^2 + \left(\frac{\partial F}{\partial \Delta P}\right)^2 \mu_{\Delta P}^2}$$

$$\mu_F = \sqrt{(\Delta P^b)^2 \mu_a^2 + (a \cdot \ln(\Delta P) \cdot \Delta P^b)^2 \mu_b^2 + RMSE^2 + (a \cdot b \cdot \Delta P^{b-1})^2 \mu_{\Delta P}^2}$$

In some embodiments, uncertainty calculator 528 assumes that the test data has no uncertainty (i.e., $\mu_{\Delta P}$=0). With this assumption, the uncertainty model can be simplified as follows:

$$\mu_F = \sqrt{\left(\frac{\partial F}{\partial a}\right)^2 \mu_a^2 + \left(\frac{\partial F}{\partial b}\right)^2 \mu_b^2 + RMSE^2}$$

$$\mu_F = \sqrt{(\Delta P^b)^2 \mu_a^2 + (a \cdot \ln(\Delta P) \cdot \Delta P^b)^2 \mu_b^2 + RMSE^2}$$

Uncertainty calculator 528 may provide the uncertainty model and/or the uncertainty model parameters (i.e., the values for $\mu_a$, $\mu_b$, and/or $\mu_{\Delta P}$) to an external system or device. For example, the uncertainty model and/or model parameters may be provided to the tested HVAC devices, untested HVAC devices, controllers for such devices, a user device, or any other system or device. In some embodiments, the uncertainty model and/or model parameters are provided to the same devices that receive the regression model coefficients a and b, as described with reference to regression model trainer 526. In some embodiments, uncertainty calculator 528 inserts the values for a, b, and RMSE (generated by regression model trainer 526) and the values for $\mu_a$, $\mu_b$, and $\mu_{\Delta P}$ (generated by uncertainty calculator 528) into the uncertainty model such that the only remaining unknown variables are $\mu_{\hat{F}}$ and $\Delta P$. The HVAC devices and/or controllers may use uncertainty model in conjunction with current pressure measurements $\Delta P$ to calculate the uncertainty $\mu_{\hat{F}}$ in the estimated flow rate $\hat{F}$.

Flow Rate Estimation

Figure 7:
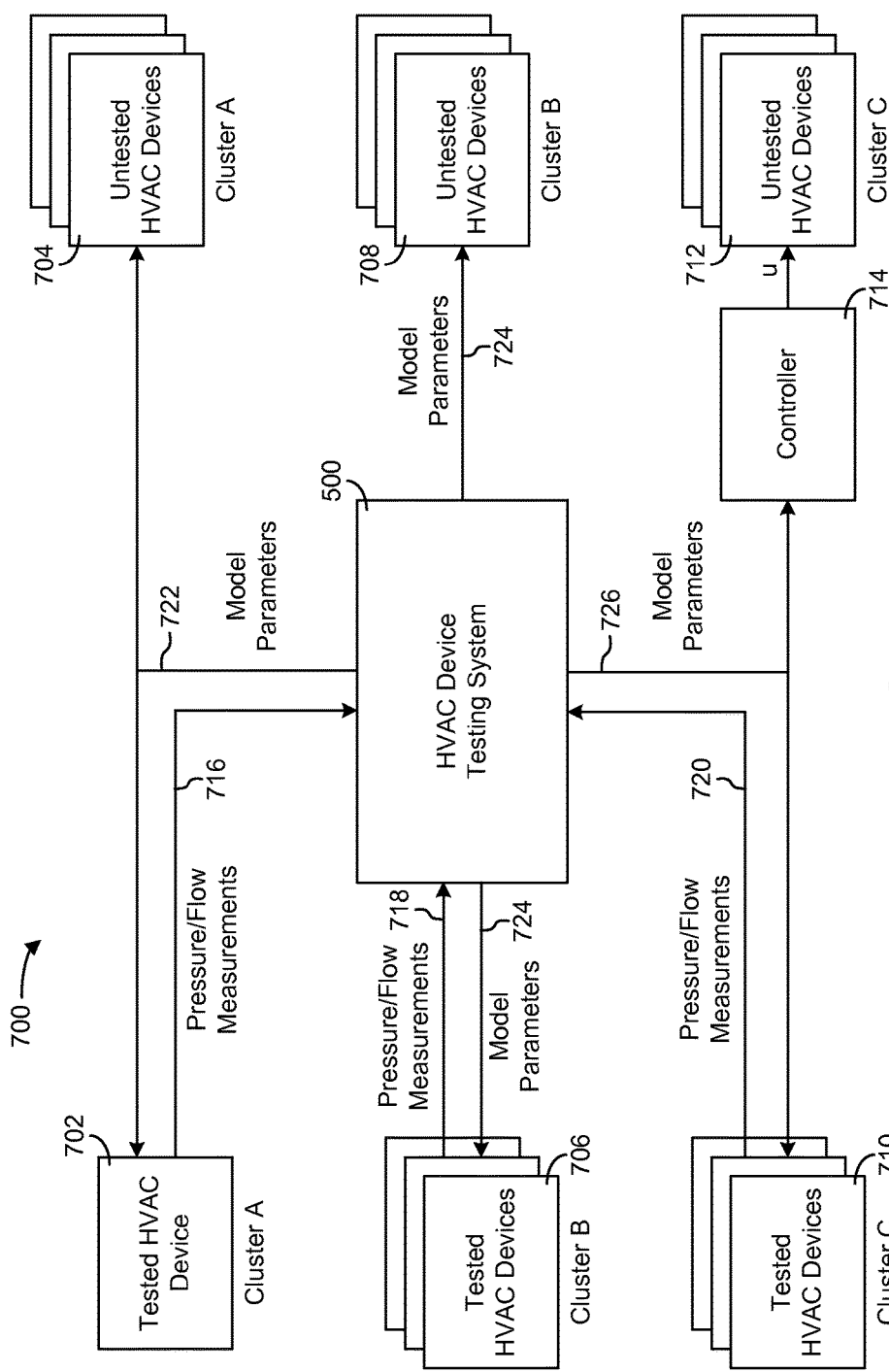
FIG. 7 is a block diagram of a HVAC system that includes the HVAC device testing system of FIG. 5 and uses model parameters generated by the HVAC device testing system to estimate flow rates through various tested and untested HVAC devices, according to an exemplary embodiment.

Referring now to FIG. 7, a block diagram illustrating a HVAC system 700 is shown, according to an exemplary embodiment. HVAC system 700 is shown to include a variety of tested and untested HVAC devices 702-712. HVAC devices 702, 706, and 710 are tested HVAC devices, whereas HVAC devices 704, 708, and 712 are untested HVAC devices. A tested HVAC device may be any HVAC device for which test data are measured and provided to HVAC device testing system 500. Test data may include pressure measurements (e.g., $P_1$, $P_2$, $\Delta P$) indicating a pressure differential across a tested HVAC device and flow rate measurements (e.g., $\dot{F}$) indicating a corresponding flow rate through the tested HVAC device. For example, tested HVAC devices 702, 706, and 710 are shown providing pressure/flow measurements 716, 718, and 720, respectively, to HVAC device testing system 500. An untested HVAC device may be any HVAC device that does not provide measured test data to HVAC device testing system 500 for purposes of generating a flow rate model.

HVAC devices 702-712 are organized into a plurality of clusters (i.e., cluster A, cluster B, and cluster C) based on one or more clustering parameters. HVAC devices 702-704 belong to cluster A; HVAC devices 706-708 belong to cluster B, and HVAC devices 710-712 belong to cluster C. In some embodiments, device clusterer 524 organizes HVAC devices 702-712 into clusters A-C such that all of the devices in each cluster have the same combination of clustering parameters. For example, all of the HVAC devices assigned to cluster A have the same text string in their model name, the same MTI number, and/or the same number of passes.

HVAC device testing system 500 may use each set of pressure/flow measurements 716-720 to generate a corresponding set of model parameters 722-726. For example, HVAC device testing system 500 may use pressure/flow measurements 716 to generate model parameters 722 for cluster A. Similarly, HVAC device testing system 500 may use pressure/flow measurements 718 and 720 to generate model parameters 724 for cluster B and model parameters 726 for cluster C. Each set of model parameters 722-726 may include regression model parameters (e.g., a and b in the regression model $\hat{F}=a\Delta P^b$) and/or uncertainty model parameters (e.g., $\mu_a$, $\mu_b$, $\mu_{\Delta P}$, and RSME in the uncertainty model $\mu_F = \sqrt{(\Delta P^b)^2 \mu_a^2 + (a \cdot \ln(\Delta P) \cdot \Delta P^b)^2 \mu_b^2 + \text{RMSE}^2 + (a \cdot b \cdot \Delta P^{b-1})^2 \mu_{\Delta P}^2}$). The regression model parameters a and b and the uncertainty model parameters $\mu_a$, $\mu_b$, $\mu_{\Delta P}$, and RSME may be generated by regression model trainer 526 and/or uncertainty calculator 528, as described with reference to FIG. 6.

HVAC device testing system 500 may provide each set of model parameters to the tested and/or untested HVAC devices for the corresponding cluster. For example, HVAC device testing system 500 may provide model parameters 722 to tested HVAC devices 702 and untested HVAC devices 704. HVAC device testing system 500 may provide model parameters 724 to tested HVAC devices 706 and untested HVAC devices 708. HVAC device testing system 500 may provide model parameters 726 to tested HVAC devices 710 and untested HVAC devices 712. In some embodiments, HVAC device testing system 500 provides the model parameters to a controller for the HVAC devices rather than the HVAC devices themselves. For example, HVAC device testing system 500 is shown providing model parameters 726 to a controller 714 for untested HVAC devices 712.

Devices 702-714 may use model parameters 722-726 to calculate an estimated flow rate $\hat{F}$ as a function of a differential pressure measurement $\Delta P$. The estimated flow rate $\hat{F}$ may be calculated using the following equation:

$$\hat{F}=a\Delta P^b$$

where the differential pressure measurement $\Delta P$ is a new differential pressure measurement measured by HVAC devices 702-712 or otherwise made available to devices 702-714. The new differential pressure measurement $\Delta P$ may be a more recent measurement not included in pressure/flow measurements 716-720. In some embodiments, devices 702-714 use model parameters 722-726 to calculate an estimated flow rate uncertainty $\mu_F$ according to the following equation:

$$\mu_F = \sqrt{(\Delta P^b)^2 \mu_a^2 + (a \cdot \ln(\Delta P) \cdot \Delta P^b)^2 \mu_b^2 + \text{RMSE}^2 + (a \cdot b \cdot \Delta P^{b-1})^2 \mu_{\Delta P}^2}$$

In some embodiments, devices 702-714 use the estimated flow rates $\hat{F}$ and/or uncertainties $\mu_F$ for load prediction, fault detection and diagnostics, energy monitoring/reporting, or other applications in which a flow rate value may be useful. For example, controller 714 may use the estimated flow rates $\hat{F}$ and/or uncertainties $\mu_F$ to generate a control signal u provided to HVAC devices 712. In some embodiments, the estimated flow rates $\hat{F}$ and/or uncertainties $\mu_F$ are reported to a supervisory controller or a client device via a communications network.

Referring now to FIG. 8, a flowchart of a process 800 for determining a flow rate through a HVAC device is shown, according to an exemplary embodiment. In some embodiments, process 800 is performed by one or more components of HVAC system 100, waterside system 200, airside system 300, BMS 400, HVAC device testing system 500, and/or a HVAC system 700, as described with reference to FIGS. 1-7.

Process 800 is shown to include measuring differential pressures across a HVAC device and corresponding flow rates through the HVAC device (step 802). The HVAC device may be any active or passive component in a HVAC system. For example, the HVAC device may be a heat exchanger (e.g., condenser, evaporator, cooling coil, heating coil, gas cooler, etc.), flow control element (e.g., pipe, duct, tube, flow restrictor, etc.), chiller, heater, electronic valve, compressor, fan, or any other HVAC component. The differential pressures $\Delta P$ and flow rates $\dot{F}$ may be measured at a plurality of different operating conditions (e.g., a plurality of different differential pressure values and corresponding flow rate values). In some embodiments, the differential pressure $\Delta P$ or the flow rate $\dot{F}$ may be a controlled variable. In other embodiments, both the differential pressure $\Delta P$ and the flow rate $\dot{F}$ are uncontrolled variables.

Step 802 may include measuring a differential pressure $\Delta P$ and flow rate $\dot{F}$ using one or more sensors. In some embodiments, one or more of the sensors are factory-installed sensors integrated with the HVAC device (e.g., a differential pressure sensor within the HVAC device). In some embodiments, one or more of the sensors are positioned upstream or downstream of the HVAC device (e.g., an upstream pressure sensor, a downstream pressure sensor, a flow rate sensor, etc.). The differential pressure $\Delta P$ may be measured directly or calculated from a pair of pressure measurements across the HVAC device. The flow rate $\dot{F}$ may be a mass flow rate or a volumetric flow rate. In some embodiments, the flow rate $\dot{F}$ is measured using a temporary flow rate sensor that is installed for testing purposes only and removed once the testing process is complete.

Still referring to FIG. 8, process 800 is shown to include training a flow rate model using the measured differential pressures and corresponding flow rates (step 804). In some embodiments, the flow rate model is a nonlinear model that estimates a flow rate $\hat{F}$ as a function of a differential pressure $\Delta P$ and one or more model parameters. For example, the flow rate model may have the form:

$$\hat{F} = a\Delta P^b$$

where a and b are the model parameters.

Step 804 may include using the measured differential pressures $\Delta P$ and flow rates $\hat{F}$ as training data to determine values for the model parameters a and b. Any of a variety of regression techniques may be used to determine the values for a and b. For example, step 804 may include using least squares regression, ordinary least squares regression, partial least squares regression, total least squares regression, generalized least squares regression, weighted least squares regression, nonlinear least squares regression, non-negative least squares regression, iteratively reweighted least squares regression, ridge regression, Bayesian regression, or any other suitable regression technique to determine values for the model parameters a and b based on the measured data received in step 802.

In some embodiments, step 804 includes combining the measured differential pressures $\Delta P$ and flow rates $\hat{F}$ received in step 802 with another set of measured differential pressures $\Delta P$ and flow rates $\hat{F}$ for another HVAC device. For example, the measured data received in step 802 may be combined with the measured data for another HVAC device within the same cluster. HVAC devices within the same cluster may have one or more shared characteristics such as device type (e.g., condenser, evaporator, etc.), device manufacturer, model code, material tube index (MTI), number of passes, evaporator or condenser code, water box type, and/or any device characteristic that affects (or correlates with) the performance of the HVAC device with respect to any of the variables measured in step 802.

In some embodiments, step 804 includes identifying one or more HVAC devices in the same cluster as the HVAC device for which the data is received in step 802. Step 804 may include combining the measured data from the identified HVAC device with the measured data received in step 802 to form a clustered set of test data. Each clustered set may include all of the test data (e.g., measured pressures and flow rates) corresponding to the HVAC devices within a particular cluster. In some embodiments, the flow rate model in step 804 is trained using all of the measured data in the clustered set.

In some embodiments, step 804 includes determining an uncertainty in the flow rate model parameters a and b (e.g., $\mu_a$, $\mu_b$), an uncertainty in the measured pressure $\Delta P$ (e.g., $\mu_{\Delta P}$), and/or a random error uncertainty (e.g., RSME) as described with reference to FIG. 6. In some embodiments, step 804 includes providing the flow rate model parameters a and b and/or the uncertainty model parameters $\mu_a$, $\mu_b$, $\mu_{\Delta P}$, and RSME to the HVAC device or a controller for the HVAC device.

Still referring to FIG. 8, process 800 is shown to include measuring a new differential pressure across the HVAC device (step 806). The new differential pressure $\Delta P_{new}$ may be another (e.g., updated or more recent) differential pressure value measured in a similar manner to the differential pressures received in step 802. For example, the new differential pressure $\Delta P_{new}$ may be measured by a factory-installed differential pressure sensor or calculated based on an upstream pressure measurement and a downstream pressure measurement.

Process 800 is shown to include estimating a new flow rate through the HVAC device using the new differential pressure as an input to the flow rate model (step 808). Step 808 may include estimating the flow rate $\hat{F}$ using the flow rate model trained in step 804:

$$\hat{F} = a\Delta P^b$$

where the values for a and b are determined in step 804 and the new differential pressure measurement $\Delta P_{new}$ received in step 806 is substituted for the differential pressure variable $\Delta P$. In some embodiments, step 808 includes calculating an uncertainty $\mu_F$ for the estimated flow rate $\hat{F}$, as described with reference to uncertainty calculator 528.

In various embodiments, step 808 is performed by the HVAC device, a controller for the HVAC device, or any other system or device that receives the flow rate model generated in step 804. The estimated flow rate $\hat{F}$ may be provided as an output from the HVAC device along with the new differential pressure measurement $\Delta P_{new}$. Advantageously, this allows the HVAC device to determine or report values for two or more correlated variables without requiring independent sensors to measure each variable.

Referring now to FIG. 9, a flowchart of a process 900 for determining a flow rate through an untested HVAC device is shown, according to an exemplary embodiment. In some embodiments, process 900 is performed by one or more components of HVAC system 100, waterside system 200, airside system 300, BMS 400, HVAC device testing system 500, and/or a HVAC system 700, as described with reference to FIGS. 1-7.

Process 900 is shown to include measuring differential pressures across a first HVAC device and corresponding flow rates through the first HVAC device (step 902). The first HVAC device may be any active or passive component in a HVAC system. For example, the first HVAC device may be a heat exchanger (e.g., condenser, evaporator, cooling coil, heating coil, gas cooler, etc.), flow control element (e.g., pipe, duct, tube, flow restrictor, etc.), chiller, heater, electronic valve, compressor, fan, or any other HVAC component. The differential pressures $\Delta P$ and flow rates $\hat{F}$ may be measured at a plurality of different operating conditions (e.g., a plurality of different differential pressure values and corresponding flow rate values). In some embodiments, the differential pressure $\Delta P$ or the flow rate $\hat{F}$ may be a controlled variable. In other embodiments, both the differential pressure $\Delta P$ and the flow rate $\hat{F}$ are uncontrolled variables.

Step 902 may include measuring a differential pressure $\Delta P$ and flow rate $\hat{F}$ using one or more sensors. In some embodiments, one or more of the sensors are factory-installed sensors integrated with the first HVAC device (e.g., a differential pressure sensor within the first HVAC device). In some embodiments, one or more of the sensors are positioned upstream or downstream of the first HVAC device (e.g., an upstream pressure sensor, a downstream pressure sensor, a flow rate sensor, etc.). The differential pressure $\Delta P$ may be measured directly or calculated from a pair of pressure measurements across the first HVAC device. The flow rate $\hat{F}$ may be a mass flow rate or a volumetric flow rate. In some embodiments, the flow rate $\hat{F}$ is measured using a temporary flow rate sensor that is installed for testing purposes only and removed once the testing process is complete.

Still referring to FIG. 9, process 900 is shown to include training a flow rate model using the measured differential pressures and corresponding flow rates (step 904). In some embodiments, the flow rate model is a nonlinear model that estimates a flow rate $\hat{F}$ as a function of a differential pressure $\Delta P$ and one or more model parameters. For example, the flow rate model may have the form:

$$\hat{F}=a\Delta P^b$$

where a and b are the model parameters.

Step 904 may include using the measured differential pressures $\Delta P$ and flow rates $\dot{F}$ as training data to determine values for the model parameters a and b. Any of a variety of regression techniques may be used to determine the values for a and b. For example, step 904 may include using least squares regression, ordinary least squares regression, partial least squares regression, total least squares regression, generalized least squares regression, weighted least squares regression, nonlinear least squares regression, non-negative least squares regression, iteratively reweighted least squares regression, ridge regression, Bayesian regression, or any other suitable regression technique to determine values for the model parameters a and b based on the measured data received in step 902.

In some embodiments, step 904 includes combining the measured differential pressures $\Delta P$ and flow rates $\dot{F}$ received in step 902 with another set of measured differential pressures $\Delta P$ and flow rates $\dot{F}$ for another HVAC device. For example, the measured data received in step 902 may be combined with the measured data for another HVAC device within the same cluster. In some embodiments, step 904 includes identifying one or more HVAC devices in the same cluster as the first HVAC device. Step 904 may include combining the measured data from the identified HVAC device with the measured data received in step 902 to form a clustered set of test data. Each clustered set may include all of the test data (e.g., measured pressures and flow rates) corresponding to the HVAC devices within a particular cluster. In some embodiments, the flow rate model in step 904 is trained using all of the measured data in the clustered set. In some embodiments, step 904 includes determining an uncertainty in the flow rate model parameters a and b (e.g., $\mu_a$, $\mu_b$), an uncertainty in the measured pressure $\Delta P$ (e.g., $\mu_{\Delta P}$), and/or a random error uncertainty (e.g., RSME) as described with reference to FIG. 6.

Still referring to FIG. 9, process 900 is shown to include measuring a differential pressure across a second HVAC device that has one or more shared characteristics with the first HVAC device (step 906). Shared characteristics may include, for example, device type (e.g., condenser, evaporator, etc.), device manufacturer, model code, material tube index (MTI), number of passes, evaporator or condenser code, water box type, and/or any device characteristic that affects (or correlates with) the performance of the first HVAC device with respect to any of the variables measured in step 902. In some embodiments, step 906 includes identifying the second HVAC device based on one or more shared characteristics with the first HVAC device. The second HVAC device may be identified as any device in the same cluster as the first HVAC device.

The differential pressure across the second HVAC device may be measured in a similar manner to the differential pressures received in step 902. For example, the differential pressure across the second HVAC device may be measured by a factory-installed differential pressure sensor or calculated based on an upstream pressure measurement and a downstream pressure measurement.

Process 900 is shown to include estimating a flow rate through the second HVAC device using the measured differential pressure across the second HVAC device as an input to the flow rate model (step 908). Step 908 may include estimating the flow rate $\hat{F}$ through the second HVAC device using the flow rate model trained in step 904:

$$\hat{F}=a\Delta P^b$$

where the values for a and b are determined in step 904 and the differential pressure measurement received in step 906 is substituted for the differential pressure variable $\Delta P$. In some embodiments, step 908 includes calculating an uncertainty $\mu_F$ for the estimated flow rate $\hat{F}$, as described with reference to uncertainty calculator 528.

In various embodiments, step 908 is performed by the second HVAC device, a controller for the second HVAC device, or any other system or device that receives the flow rate model generated in step 904. The estimated flow rate $\hat{F}$ may be provided as an output from the second HVAC device along with the differential pressure measurement across the second HVAC device. Advantageously, this allows the second HVAC device to determine or report values for two or more correlated variables without requiring independent sensors to measure each variable.

Figure 10:
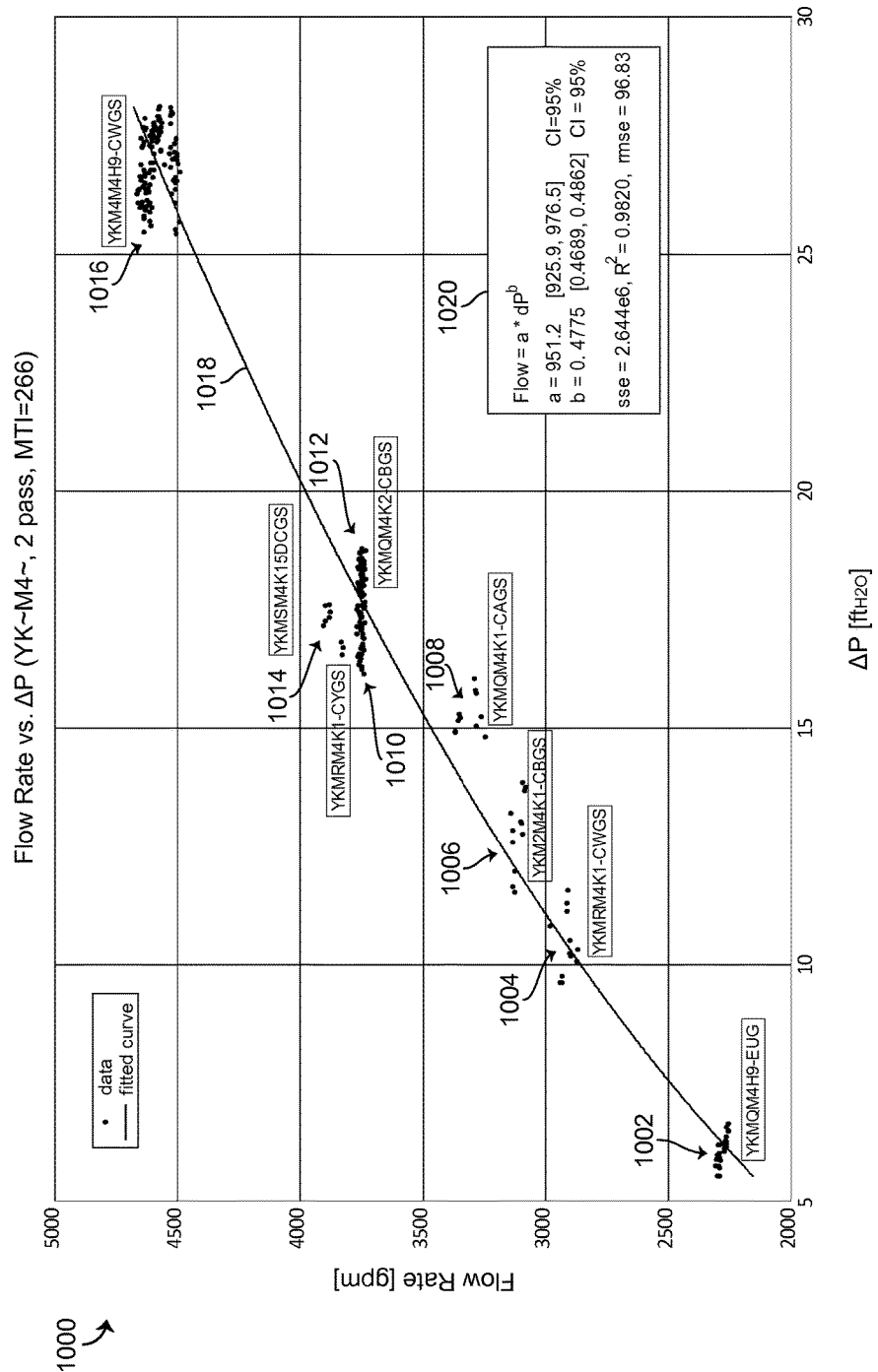
FIG. 10 is a graph plotting test data including measured pressure differentials and corresponding flow rates for a cluster of HVAC devices, and a flow rate model generated based on the measured test data, according to an exemplary embodiment.

Referring now to FIG. 10, a graph 1000 of a nonlinear regression model is shown, according to an exemplary embodiment. Graph 1000 plots flow rate $\dot{F}$ vs. differential pressure $\Delta P$ for a cluster of tested HVAC devices. Each of the HVAC devices represented in graph 1000 has device characteristics that satisfy a given set of clustering parameters. For example, each of the HVAC devices represented in graph 1000 has a model name that includes the text string "YK~M4~" where the "~" character is a wildcard (e.g., YKMQM4H9-EUG, YKMRM4K1-CWGS, YKM2M4K1-CAGS, etc.). Each of the HVAC devices represented in graph 1000 also is a two-pass heat exchanger with a MTI of 266. Device clusterer 524 may use these and/or other clustering parameters to select the HVAC devices that are included in graph 1000.

Graph 1000 is shown to include several sets of test data 1002-1016. Each set of test data 1002-1016 corresponds to a tested HVAC device within the cluster. For example, test data 1002 corresponds to the HVAC device "YKMQM4H9-EUG," test data 1004 corresponds to the HVAC device "YKMRM4K1-CWGS," test data 1006 corresponds to the HVAC device "YKM2M4K1-CBGS," and so on. Each data point of test data 1002-1016 includes a differential pressure value $\Delta P$ and a corresponding flow rate value $\dot{F}$. Test data 1002-1016 may be collected using one or more sensors configured to measure the differential pressures $\Delta P$ and the corresponding flow rates $\dot{F}$ for the tested HVAC devices. Test data 1002-1016 may be combined into a clustered set of test data and used to train a regression model.

Graph 1000 is shown to include a flow rate model 1018. As shown in FIG. 10, flow rate model 1018 is a nonlinear regression model. For example, flow rate model 1018 may have the form $\dot{F}=a\Delta P^b$, where the coefficients a and b are trained using test data 1002-1016. Regression model trainer 526 may use any of a variety of regression analyses to determine optimal values for coefficients a and b, as described with reference to FIG. 6. The optimal values may be values which result in the best fit of flow rate model 1018 to test data 1002-1016. For example, the regression analysis performed by regression model trainer 526 may generate the regression coefficients a=951.2 and b=0.4775, as shown in parameter display 1020. The regression coefficients a and b and/or the flow rate model 1018 may be provided to the tested HVAC devices in the cluster and/or untested HVAC devices that satisfy the clustering parameters. The HVAC devices may then use flow rate model 1018 to estimate a flow rate $\hat{F}$ as a function of a measured differential pressure $\Delta P$.

The regression analysis performed by regression model trainer 526 may also generate containment limits for the regression coefficients a and b. For example, parameter display 1020 indicates that the containment limits for a are [925.9 976.5] (i.e., a=951.2±25.3), whereas the containment limits for b are [0.4689 0.4862] (i.e., b=0.4775±0.0087). A containment probability of 95% is provided for each of the containment limits. The regression analysis performed by regression model trainer 526 may also generate a RMSE value, shown in parameter display 1020 as RMSE=96.83.

The parameters shown in parameter display 1020 may be used by uncertainty calculator 528 to generate the parameters of an uncertainty model (e.g., $\mu_a$, $\mu_b$, RSME, etc.), as described with reference to FIG. 6. The uncertainty model parameters and/or the uncertainty model may be provided to the tested HVAC devices in the cluster and/or untested HVAC devices that satisfy the clustering parameters. The HVAC devices may then use uncertainty model to calculate an uncertainty $\mu_F$ in the estimated flow rate $\hat{F}$ as a function of a measured differential pressure $\Delta P$ and the uncertainty model parameters.

Figure 11:
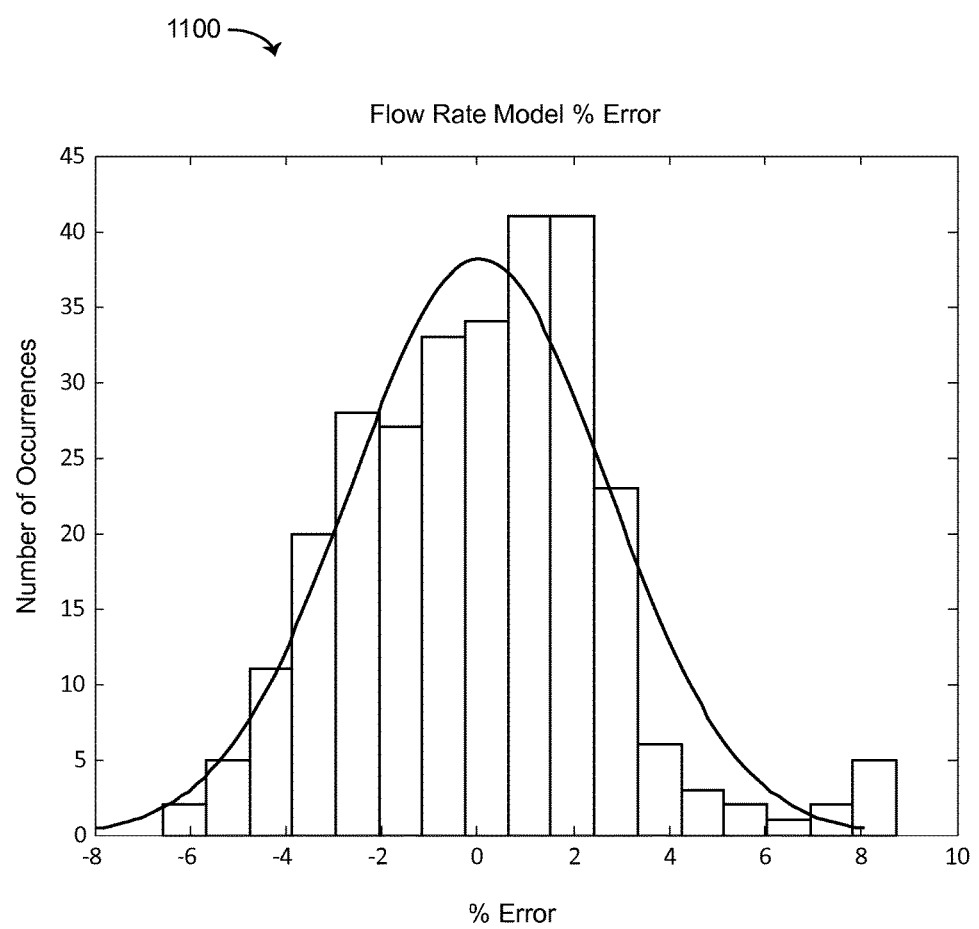
FIG. 11 is a graph illustrating the accuracy of the flow rate model of FIG. 10, according to an exemplary embodiment.

Referring now to FIG. 11, a graph 1100 of the flow rate model percentage error is shown, according to an exemplary embodiment. Graph 1100 plots the percentage error of flow rate model 1018 with respect to the actual flow rate values included in test data 1002-1016. As evidenced by graph 1100, flow rate model 1018 has a maximum error of approximately 8%, with the majority of the error values within ±2%. These results indicate that flow rate model 1018 is highly accurate and can be used to provide an accurate estimate of the flow rate $\hat{F}$.

Figure 12:
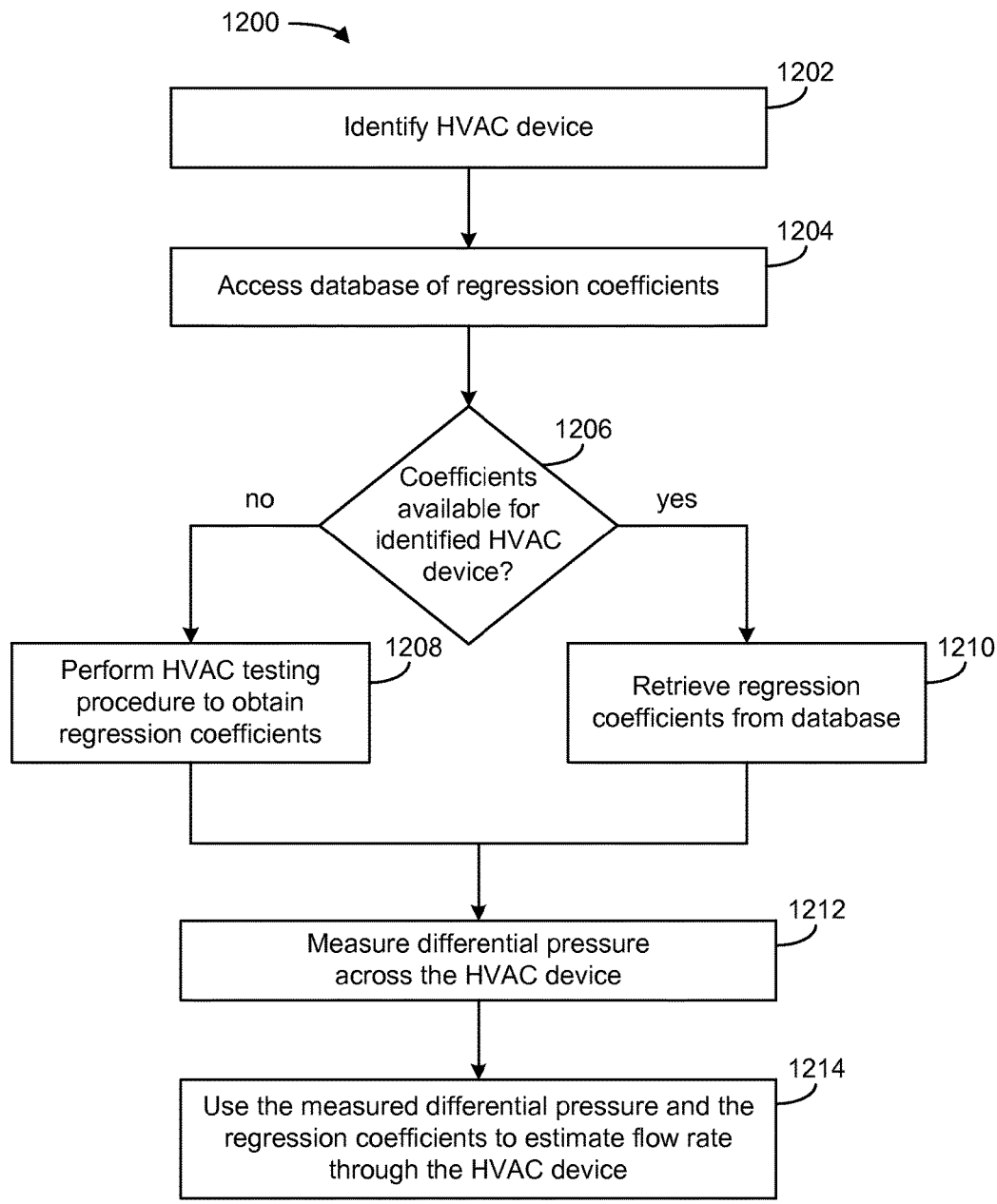
FIG. 12 is a flowchart of a process for obtaining regression parameters for a HVAC device and using the regression parameters to estimate flow rate through the HVAC device, according to an exemplary embodiment.

Referring now to FIG. 12, a flowchart of a process 1200 for determining a flow rate through a HVAC device is shown, according to an exemplary embodiment. In some embodiments, process 1200 is performed by one or more components of HVAC system 100, waterside system 200, airside system 300, BMS 400, HVAC device testing system 500, and/or a HVAC system 700, as described with reference to FIGS. 1-7. Process 1200 may be used to automatically obtain regression coefficients for a HVAC device and use the regression coefficients to estimate a flow rate through the HVAC device.

Process 1200 is shown to include identifying the HVAC device (step 1202). The HVAC device may be any active or passive component in a HVAC system. For example, the HVAC device may be a heat exchanger (e.g., condenser, evaporator, cooling coil, heating coil, gas cooler, etc.), flow control element (e.g., pipe, duct, tube, flow restrictor, etc.), chiller, heater, electronic valve, compressor, fan, or any other HVAC component. Step 1202 may include identifying one or more characteristics of the device such as the device type, device manufacturer, model code, material tube index (MTI), number of heat exchange passes, water box type, and/or any device characteristic that describes the HVAC device.

Process 1200 is shown to include accessing a database of regression coefficients (step 1204). The database of regression coefficients may be a local database or a remote database accessible via a communications network (e.g., a LAN, the Internet, etc.). The database of regression coefficients may include sets of regression coefficients a and b for different types of HVAC devices. Each set of regression coefficients a and b may be stored in the regression coefficients database with one or more parameters that characterize the HVAC device or devices to which the set of regression coefficients apply (e.g., device type, device manufacturer, model code, MTI, etc.). In some embodiments, the database of regression coefficients is populated by performing the HVAC device testing procedure described with reference to FIGS. 5B-6.

Still referring to FIG. 12, process 1200 is shown to include determining whether coefficients are available for the identified HVAC device (step 1206). Step 1206 may include determining whether any of the sets regression coefficients in the regression coefficients database are stored with parameters that match the characteristics of the identified HVAC device. If a match is found, step 1206 may include determining that coefficients are available for the identified HVAC device (i.e., the result of step 1206 is "yes") and the corresponding set of regression coefficients may be retrieved from the regression coefficients database (step 1210). However, if a match is not found, step 1206 may include determining that coefficients are not available for the identified HVAC device (i.e., the result of step 1206 is "no") and the HVAC testing procedure may be performed to obtain the regression coefficients for the identified HVAC device (step 1208). In some embodiments, the HVAC device testing procedure is the same or similar to the field testing procedure described with reference to FIG. 5A. The regression coefficients may be stored within the HVAC device or a controller for the HVAC device.

Process 1200 is shown to include measuring a differential pressure across the HVAC device (step 1212) and using the measured differential pressure and the regression coefficients to estimate flow rate through the HVAC device (step 1214). The differential pressure across the HVAC device may be measured by a factory-installed differential pressure sensor or calculated based on an upstream pressure measurement and a downstream pressure measurement. Step 1214 may include estimating the flow rate $\hat{F}$ through the HVAC device using a flow rate model trained with the regression coefficients received in step 1208 or step 1210. For example, step 1214 may include calculating flow rate using the model:

$$\hat{F} = a\Delta P^b$$

where the values for a and b are the regression coefficients obtained in step 1208 or step 1210 and $\Delta P$ is the differential pressure measurement obtained in step 1212.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling a mass or volumetric flow rate through a device, the system comprising:
    a flow control device operable to modulate a flow rate of a fluid through a tested device;
    a device testing system configured to operate the flow control device over a range of fluid flow conditions to achieve a plurality of different flow rates through the tested device;
    one or more pressure sensors configured to measure a plurality of pressure differentials across the tested device, each of the measured pressure differentials corresponding to one of the plurality of different flow rates through the tested device;
    a flow rate sensor configured to measure the plurality of different flow rates through the tested device, each of the measured flow rates corresponding to one of the measured pressure differentials;
    a device clusterer configured to organize a plurality of devices into clusters based on one or more device characteristics associated with the devices and configured to generate a clustered set of test data comprising (1) the measured pressure differentials and corresponding flow rates for the tested device and (2) measured pressure differentials and corresponding flow rates for one or more other devices organized into a same cluster as the tested device;
    a regression model trainer configured to generate regression coefficients (a and b) for a flow rate model using all the measured pressure differentials and corresponding flow rates in the clustered set of test data, wherein the flow rate model estimates a flow rate ($\hat{F}$) as a function of a pressure differential ($\Delta P$) and the regression coefficients (a and b), the flow rate model comprising $\hat{F}=a\Delta P^b$;
    a flow rate estimator configured to use the flow rate model to estimate a flow rate through an untested device as a function of a new measured pressure differential across the untested device; and
    a controller configured to use the estimated flow rate to generate a control signal for a controllable device and operate the controllable device using the control signal, the control signal causing the controllable device to adjust the flow rate through the untested device.

2. The system of claim 1, wherein the tested device is a first heat exchanger and the untested device is a second heat exchanger that has one or more device characteristics in common with the first heat exchanger.

3. The system of claim 2, wherein the one or more device characteristics comprise at least one of a device model code, a material tube index, a number of heat exchange passes, and a water box type.

4. The system of claim 1, wherein the flow rate estimator is a component of the untested device and the estimated flow rate is a flow rate through the untested device.

5. The system of claim 1, wherein the flow rate estimator is a component of a controller for the tested or untested device.

6. The system of claim 1, wherein the device clusterer is configured to select the untested device from a plurality of devices organized into a same cluster as the tested device.

7. The system of claim 1, further comprising an uncertainty calculator configured to:
    determine an uncertainty of one or more of the regression coefficients in the flow rate model;
    generate a set of uncertainty model parameters based on the determined uncertainties; and
    use the uncertainty model parameters, an idiosyncratic uncertainty, and a sensor uncertainty in an uncertainty model to determine an uncertainty of the estimated flow rate.

8. A method for controlling a mass or volumetric flow rate through a tested device, the method comprising:
    operating a flow control device to modulate a flow rate of a fluid through a tested device over a range of fluid flow conditions to achieve a plurality of different flow rates through the tested device;
    measuring pressure differentials across the tested device and corresponding flow rates through the tested device at a plurality of different pressure differentials and flow rates;
    organizing a plurality of devices comprising the tested device and one or more other devices into clusters based on one or more device characteristics associated with the plurality of devices, wherein the one or more device characteristics comprise at least one of a device model code, a material tube index, a number of heat exchange passes, and a water box type;
    generating a clustered set of test data comprising (1) the measured pressure differentials and corresponding flow rates for the tested device and (2) measured pressure differentials and corresponding flow rates for one or more of the other devices organized into a same cluster as the tested device;

generating regression coefficients (a and b) for a flow rate model using all the measured pressure differentials and corresponding flow rates in the clustered set of test data, wherein the flow rate model estimates a flow rate ($\hat{F}$) as a function of a pressure differential ($\Delta P$) and the regression coefficients (a and b), the flow rate model comprising $\hat{F}=a\Delta P^b$;

measuring a new pressure differential across the tested device;

estimating a new flow rate through the tested device using the new pressure differential as an input to the flow rate model;

generating a control signal for a controllable device using the new flow rate; and operating the controllable device using the control signal, the control signal causing the controllable device to adjust the flow rate through the tested device.

9. The method of claim 8, further comprising:

determining an uncertainty of one or more trained parameters in the flow rate model;

generating a set of uncertainty model parameters based on the determined uncertainties; and using the uncertainty model parameters, an idiosyncratic uncertainty, and a sensor uncertainty in an uncertainty model to determine an uncertainty of the estimated flow rate.

10. A method for controlling a mass or volumetric flow rate through a device, the method comprising:

operating a flow control device to modulate a flow rate of a fluid through a first device over a range of fluid flow conditions to achieve a plurality of different flow rates through the first device;

measuring pressure differentials across the first device and corresponding flow rates through the first device at a plurality of different pressure differentials and flow rates;

organizing a plurality of devices comprising the first device and one or more other devices into clusters based on one or more device characteristics associated with the plurality of devices;

generating a clustered set of test data comprising (1) the measured pressure differentials and corresponding flow rates for the first device and (2) measured pressure differentials and corresponding flow rates for one or more other devices organized into a same cluster as the first device;

training a flow rate model using all the measured pressure differentials and corresponding flow rates in the clustered set of test data, wherein the flow rate model estimates a flow rate as a function of a pressure differential;

measuring a pressure differential across a second device that has one or more device characteristics in common with the first device;

estimating a flow rate through the second device using the measured pressure differential across the second device as an input to the flow rate model;

generating a control signal for a controllable device using the estimated flow rate; and operating the controllable device using the control signal, the control signal causing the controllable device to adjust the flow rate through the tested device.

11. The method of claim 10, wherein the first device is a first heat exchanger and the second device is a second heat exchanger that has one or more device characteristics in common with the first heat exchanger;

wherein the one or more device characteristics comprise at least one of a device model code, a material tube index, a number of heat exchange passes, and a water box type.

12. The method of claim 10, further comprising:

determining an uncertainty of one or more trained parameters in the flow rate model;

generating a set of uncertainty model parameters based on the determined uncertainties; and using the uncertainty model parameters, an idiosyncratic uncertainty, and a sensor uncertainty in an uncertainty model to determine an uncertainty of the estimated flow rate.

* * * * *